(12) United States Patent
Mahara

(10) Patent No.: US 12,411,217 B2
(45) Date of Patent: Sep. 9, 2025

(54) MEASUREMENT DEVICE AND DISTANCE MEASURING DEVICE

(71) Applicant: SONY SEMICONDUCTOR SOLUTIONS CORPORATION, Kanagawa (JP)

(72) Inventor: Kumiko Mahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1080 days.

(21) Appl. No.: 17/310,082

(22) PCT Filed: Jan. 17, 2020

(86) PCT No.: PCT/JP2020/001541
§ 371 (c)(1),
(2) Date: Jul. 15, 2021

(87) PCT Pub. No.: WO2020/153262
PCT Pub. Date: Jul. 30, 2020

(65) Prior Publication Data
US 2022/0075028 A1    Mar. 10, 2022

(30) Foreign Application Priority Data

Jan. 24, 2019  (JP) .................................. 2019-010673

(51) Int. Cl.
G01S 7/00    (2006.01)
G01S 7/486   (2020.01)
G01S 17/08   (2006.01)

(52) U.S. Cl.
CPC .............. *G01S 7/486* (2013.01); *G01S 17/08* (2013.01)

(58) Field of Classification Search
USPC ....................................................... 356/5.01
See application file for complete search history.

(56) References Cited

U.S. PATENT DOCUMENTS 10,645,323 B2 *   5/2020   Takahashi ............ H04N 25/443
10,873,715 B2 *  12/2020   Hanzawa ............. H04N 25/779
(Continued)

FOREIGN PATENT DOCUMENTS

CN    107431774 A    12/2017
JP    2007-142738 A   6/2007
(Continued)

OTHER PUBLICATIONS

International Search Report and Written Opinion of PCT Application No. PCT/JP2020/001541, issued on Feb. 18, 2020, 09 pages of ISRWO.

*Primary Examiner* — James R Hulka
(74) *Attorney, Agent, or Firm* — CHIP LAW GROUP

(57) ABSTRACT

A measurement device includes: a light receiving unit including a plurality of pixels disposed in a target region in a matrix array, a controller that designates one or more target pixels, of a plurality of pixels, from which a signal is to be read, and a signal processing unit that performs a signal process based on a signal read from one or more target pixels included in a block having a predetermined width in the row direction of the array and having a variable height in the column direction. The controller switches, according to an instruction, between a first mode in which one or more target pixels are designated after performing thinning on the plurality of pixels, and a second mode in which one or more target pixels are designated without performing thinning.

18 Claims, 22 Drawing Sheets

(56) References Cited

U.S. PATENT DOCUMENTS

| | | | |
|---|---|---|---|
| 11,635,497 B2* | 4/2023 | Kubota | G01S 7/4863 250/214.1 |
| 2014/0125855 A1 | 5/2014 | Maeda et al. | |
| 2018/0077374 A1 | 3/2018 | Takahashi | |
| 2018/0081040 A1* | 3/2018 | Kubota | G01S 7/4863 |
| 2020/0036930 A1* | 1/2020 | Hanzawa | H04N 25/46 |

FOREIGN PATENT DOCUMENTS

| | | |
|---|---|---|
| JP | 2010-091377 A | 4/2010 |
| JP | 2016-184843 A | 10/2016 |
| JP | 2018-007035 A | 1/2018 |
| JP | 2018-044923 A | 3/2018 |
| WO | 2016/152635 A1 | 9/2016 |
| WO | 2018/003305 A1 | 1/2018 |

* cited by examiner

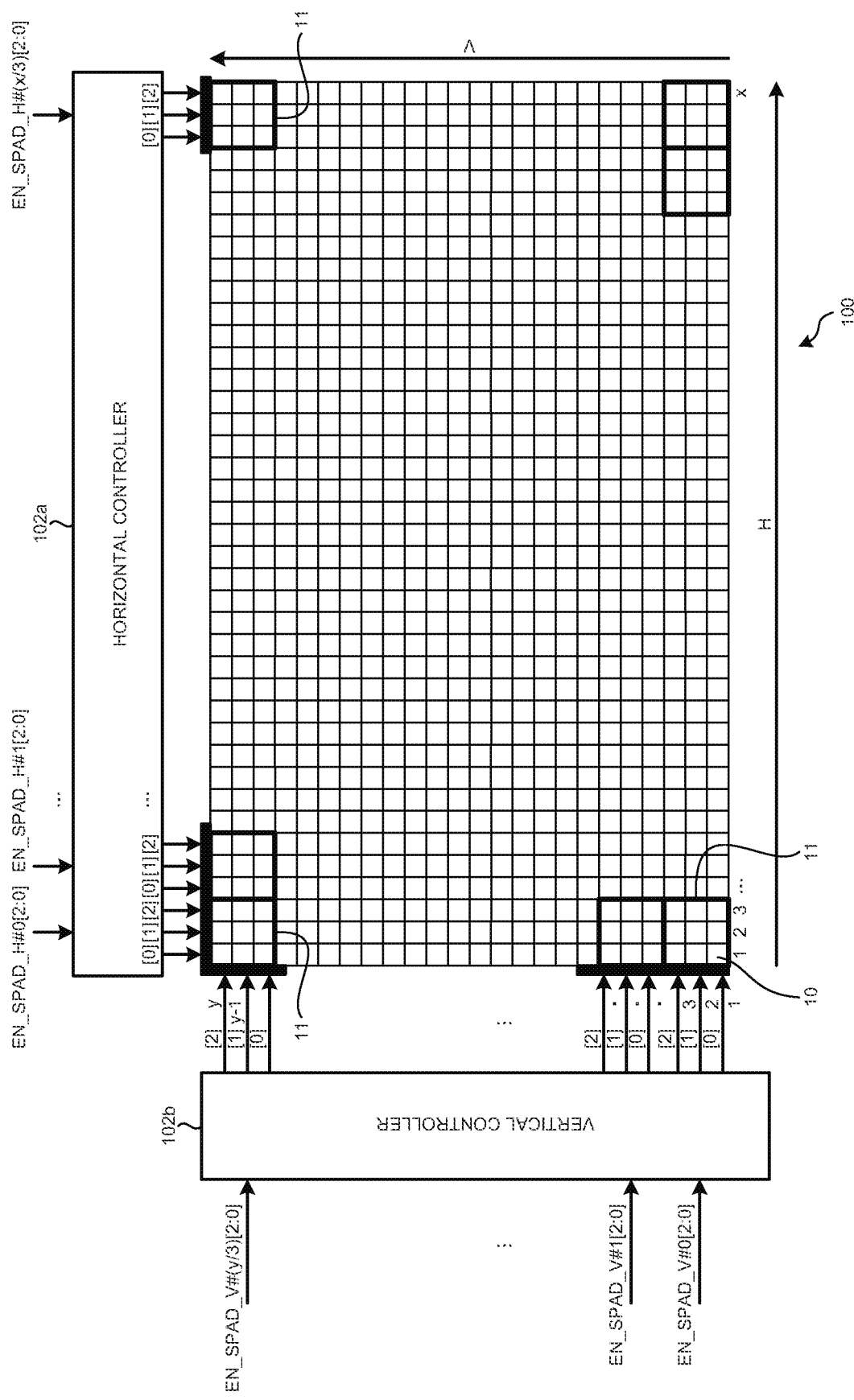

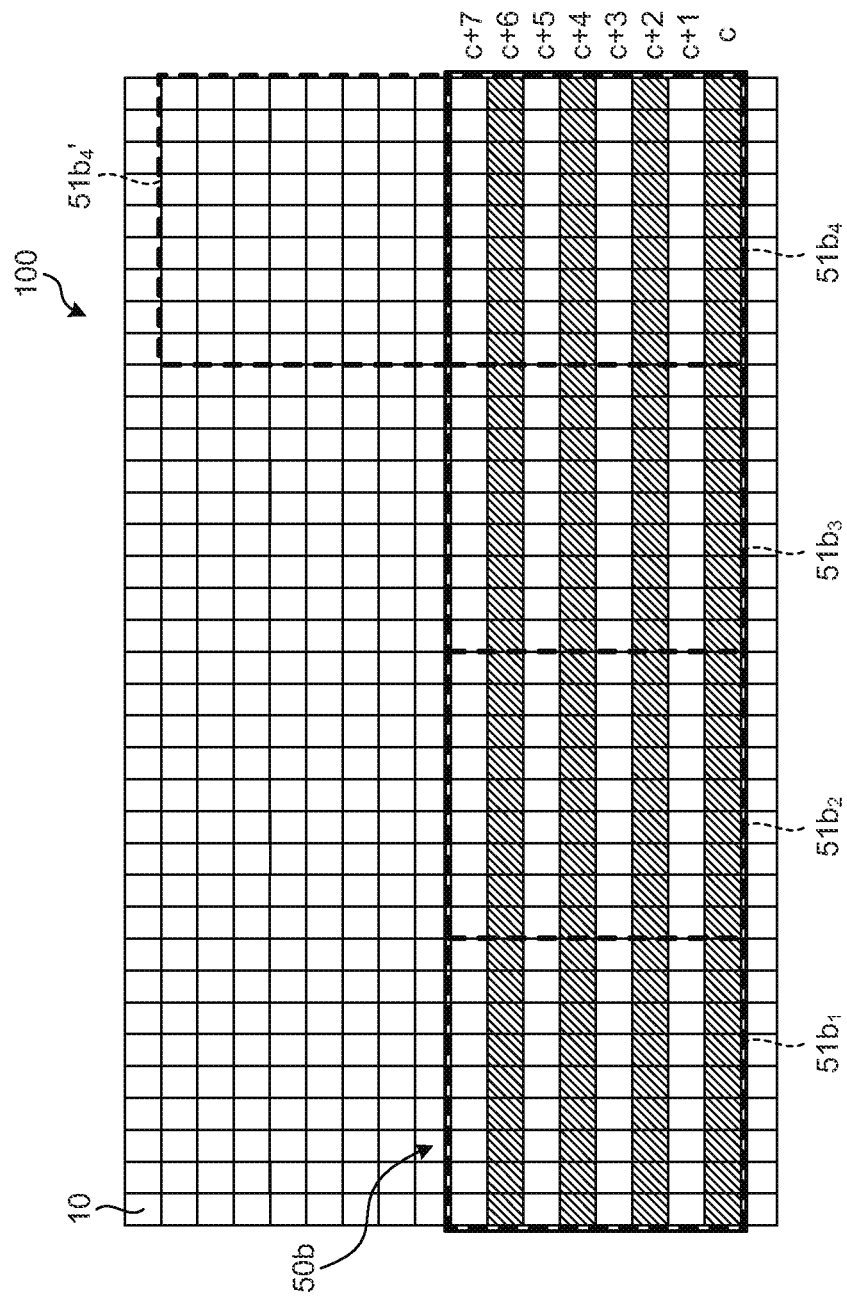

MEASUREMENT DEVICE AND DISTANCE MEASURING DEVICE

CROSS REFERENCE TO RELATED APPLICATIONS

This application is a U.S. National Phase of International Patent Application No. PCT/JP2020/001541 filed on Jan. 17, 2020, which claims priority benefit of Japanese Patent Application No. JP 2019-010673 filed in the Japan Patent Office on Jan. 24, 2019. Each of the above-referenced applications is hereby incorporated herein by reference in its entirety.

FIELD

The present invention relates to a measurement device and a distance measuring device.

BACKGROUND

As one of the distance measuring methods for measuring the distance to an object to be measured using light, a distance measuring method called a direct time of flight (ToF) method is known. In the distance measuring process by the direct ToF method, the light receiving element receives the reflected light generated when the light emitted from the light source is reflected by the object to be measured. Based on the detection signal read from the light receiving element in response to the light reception of the reflected light, the time from the emission of the light to the reception as the reflected light is measured. A histogram is created based on the measured time, and the distance to the target is calculated based on this histogram. Further, in the direct ToF method, there is known a configuration in which distance measurement is performed using a pixel array in which light receiving elements are disposed in a two-dimensional lattice pattern.

CITATION LIST

Patent Literature

Patent Literature 1: JP 2018-044923 A

SUMMARY

Technical Problem

In the distance measurement using the pixel array described above, there is known a method of creating a histogram by simultaneously performing reading from a plurality of light receiving elements (during the same period). In this case, the region in which the reading of the plurality of light receiving elements can be performed at the same time is restricted in terms of the power consumption that drives the light receiving elements and the circuit scale. In order to mitigate this restriction, there is a demand for a technique capable of more efficiently reading the detection signal from the region.

An object of the present disclosure is to provide a measurement device and a distance measuring device capable of more efficiently reading a detection signal from a pixel array.

Solution to Problem

For solving the problem described above, a measurement device according to one aspect of the present disclosure has a light receiving unit including a plurality of pixels disposed in a target region in a matrix array; a controller that designates one or more target pixels, of the plurality of pixels, from which a signal is to be read; and a signal processing unit that performs a signal process based on the signal read from the one or more target pixels included in a block having a predetermined width in a row direction of the array and having a variable height in a column direction, wherein the controller switches, according to an instruction, between a first mode in which the one or more target pixels are designated after performing thinning on the plurality of pixels, and a second mode in which the one or more target pixels are designated without performing the thinning.

BRIEF DESCRIPTION OF DRAWINGS

FIG. 7 is a diagram illustrating a more specific configuration example of a pixel array unit according to the embodiment.

FIG. 13 is a diagram for explaining mitigation of the influence from adjacent blocks by thinning out target pixels according to the first embodiment.

DESCRIPTION OF EMBODIMENTS

Figure 1:
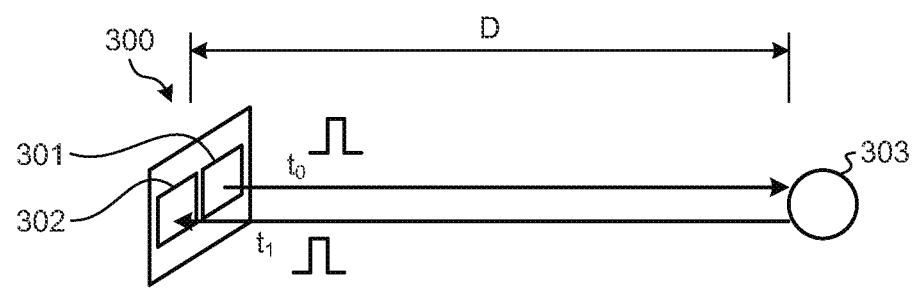
FIG. 1 is a diagram schematically illustrating distance measurement by the direct ToF method applicable to the embodiment.

Hereinafter, the embodiments of the present disclosure will be described in detail with reference to the drawings. In the following embodiments, the same parts are designated by the same reference numerals, so that duplicate description will be omitted.

Technology Applicable to Each Embodiment

The present disclosure relates to a technique for performing distance measurement using light. Prior to the description of each embodiment of the present disclosure, the techniques applicable to each embodiment will be described for ease of understanding. In each embodiment, the direct time of flight (ToF) method is applied as the distance measuring method. The direct ToF method is a method in which the light receiving element receives the reflected light when the light emitted from the light source is reflected by the object to be measured, and the distance is measured based on the time difference between the light emission timing and the light reception timing.

The direct ToF method of distance measurement will be schematically described with reference to FIGS. 1 and 2. FIG. 1 is a diagram schematically illustrating distance measurement by the direct ToF method applicable to each embodiment. A distance measuring device 300 includes a light source unit 301 and a light receiving unit 302. The light source unit 301 is, for example, a laser diode, and is driven so as to emit the laser beam in a pulsed manner. The light emitted from the light source unit 301 is reflected by an object to be measured 303 and is received by the light receiving unit 302 as reflected light. The light receiving unit 302 includes a light receiving element that converts light into an electrical signal by photoelectric conversion to output a signal corresponding to the received light.

Here, the time when the light source unit 301 emits light (light emission timing) is time $t_0$, and the time when the light receiving unit 302 receives the reflected light when the light emitted from the light source unit 301 is reflected by the object to be measured 303 (light reception timing) is $t_1$. Assuming that the constant c is the speed of light (2.9979×$10^8$ [m/sec]), the distance D between the distance measuring device 300 and the object to be measured 303 is calculated by the following equation (1).

$$D=(c/2)\times(t_1-t_0) \quad (1)$$

The distance measuring device 300 repeats the above-mentioned process a plurality of times. The light receiving unit 302 may include a plurality of light receiving elements, and the distance D may be calculated based on each light reception timing when the reflected light is received by each light receiving element. The distance measuring device 300 classifies time $t_m$ (called the light receiving time $t_m$) from time $t_0$ at the light emission timing to the light reception timing when the light is received by the light receiving unit 302 based on the class (bins) to generate a histogram.

The light received by the light receiving unit 302 during the light receiving time $t_m$ is not limited to the reflected light when the light emitted from the light source unit 301 is reflected by the object to be measured. For example, the ambient light around the distance measuring device 300 (light receiving unit 302) is also received by the light receiving unit 302.

Figure 2:
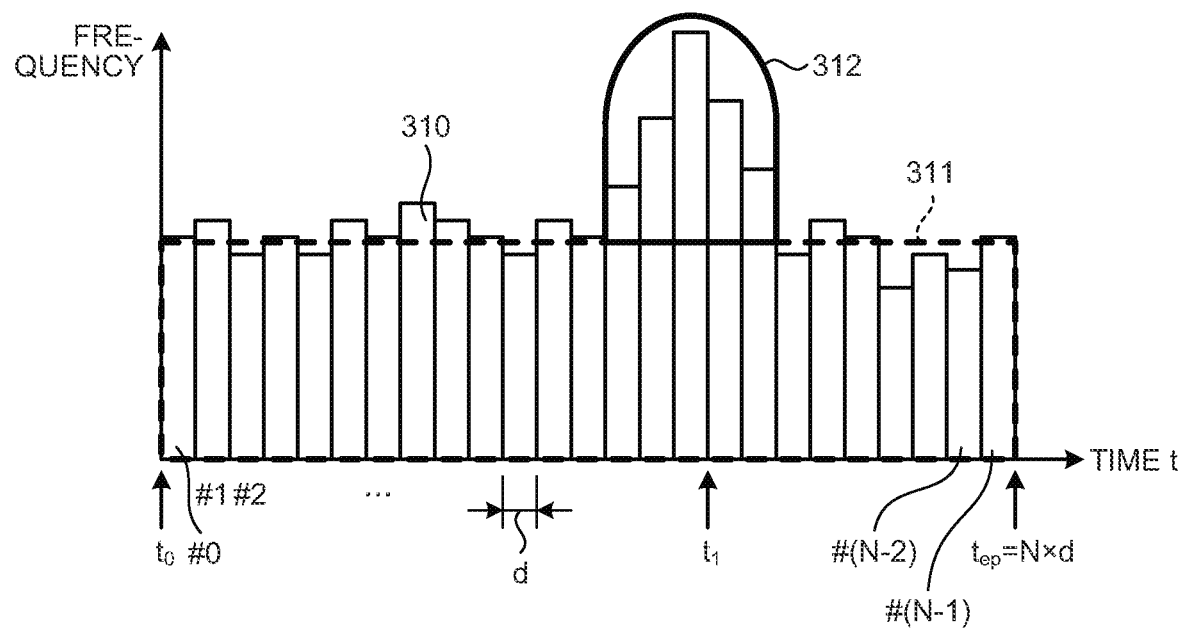
FIG. 2 is a diagram illustrating an example histogram based on the time of light reception applicable to the embodiment.

FIG. 2 is a diagram illustrating an example histogram based on the time when the light receiving unit 302 receives light applicable to each embodiment. In FIG. 2, the horizontal axis indicates the bin and the vertical axis indicates the frequency for each bin. The bin is a classification of the light receiving time $t_m$ for each predetermined unit time d. Specifically, bin #0 represents $0 \leq t_m < d$, bin #1 represents $d \leq t_m < 2 \times d$, bin #2 represents $2 \times d \leq t_m < 3 \times d$, . . . , and bin #(N−2) represents (N−2)×d ≤ $t_m$ < (N−1)×d. When the exposure time of the light receiving unit 302 is time $t_{ep}$, $t_{ep}$=N×d.

The distance measuring device 300 counts the number of times the light receiving time $t_m$ is acquired based on the bin to obtain a frequency 310 for each bin to generate a histogram. Here, the light receiving unit 302 also receives light other than the reflected light reflected when the light emitted from the light source unit 301 is reflected. As an example of such light other than the target reflected light, there is the above-mentioned ambient light. The portion indicated by a range 311 in the histogram includes the ambient light component due to the ambient light. The ambient light is light that is randomly incident on the light receiving unit 302 and is noise with respect to the reflected light of interest.

On the other hand, the target reflected light is light received according to a specific distance and appears as an active light component 312 in the histogram. The bin corresponding to the frequency of the peak in the active light component 312 is the bin corresponding to the distance D of the object to be measured 303. By acquiring the representative time of the bin (for example, the time in the center of the bin) as the time $t_1$ described above, the distance measuring device 300 can calculate the distance D to the object to be measured 303 according to the above equation (1). In this way, by using a plurality of light receiving results, it is possible to perform appropriate distance measurement for random noise.

Figure 3:
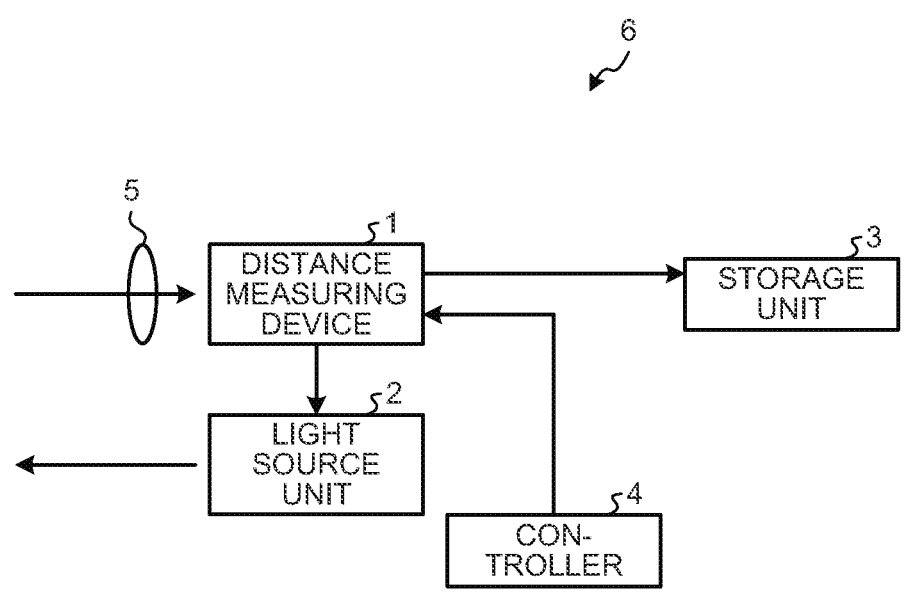
FIG. 3 is a block diagram illustrating a configuration of an example of an electronic device including a distance measuring device according to the embodiment.

FIG. 3 is a block diagram illustrating a configuration of an example of an electronic device including the distance measuring device according to each embodiment. In FIG. 3, an electronic device 6 includes a distance measuring device 1, a light source unit 2, a storage unit 3, a controller 4, and an optical system 5.

The light source unit 2 corresponds to the light source unit 301 described above and is a laser diode, and is driven so as to emit the laser beam in a pulsed manner, for example. A vertical cavity surface emitting laser (VCSEL) that emits the laser beam can be applied for the light source unit 2 as a face light source. Not limited to this, the light source unit 2 may have a configuration in which an array in which laser diodes are disposed on a line may be used, and the laser beam emitted from the laser diode array is scanned in a direction perpendicular to the line. Furthermore, it may have a configuration in which a laser diode as a single light source is used and the laser beam emitted from the laser diode is scanned in the horizontal and vertical directions.

The distance measuring device 1 includes a plurality of light receiving elements corresponding to the light receiving unit 302 described above. The plurality of light receiving elements are, for example, disposed in a two-dimensional lattice to form a light receiving face. The optical system 5 guides light incident from the outside to the light receiving face included in the distance measuring device 1.

The controller 4 controls the overall operation of the electronic device 6. For example, the controller 4 supplies the distance measuring device 1 with a light emitting trigger that is a trigger for causing the light source unit 2 to emit light. The distance measuring device 1 causes the light source unit 2 to emit light at timing based on this light emitting trigger to store time to indicating the light emission timing. Further, the controller 4 sets a pattern for distance measurement for the distance measuring device 1 in response to an instruction from the outside, for example.

The distance measuring device 1 counts the number of times that time information (light receiving time $t_m$) indicating the timing at which light is received by the light receiving face is acquired within a predetermined time range to obtain the frequency for each bin to generate the above-mentioned histogram. The distance measuring device 1 further calculates the distance D to the object to be measured based on the generated histogram. The information indicating the calculated distance D is stored in the storage unit 3.

Figure 4:
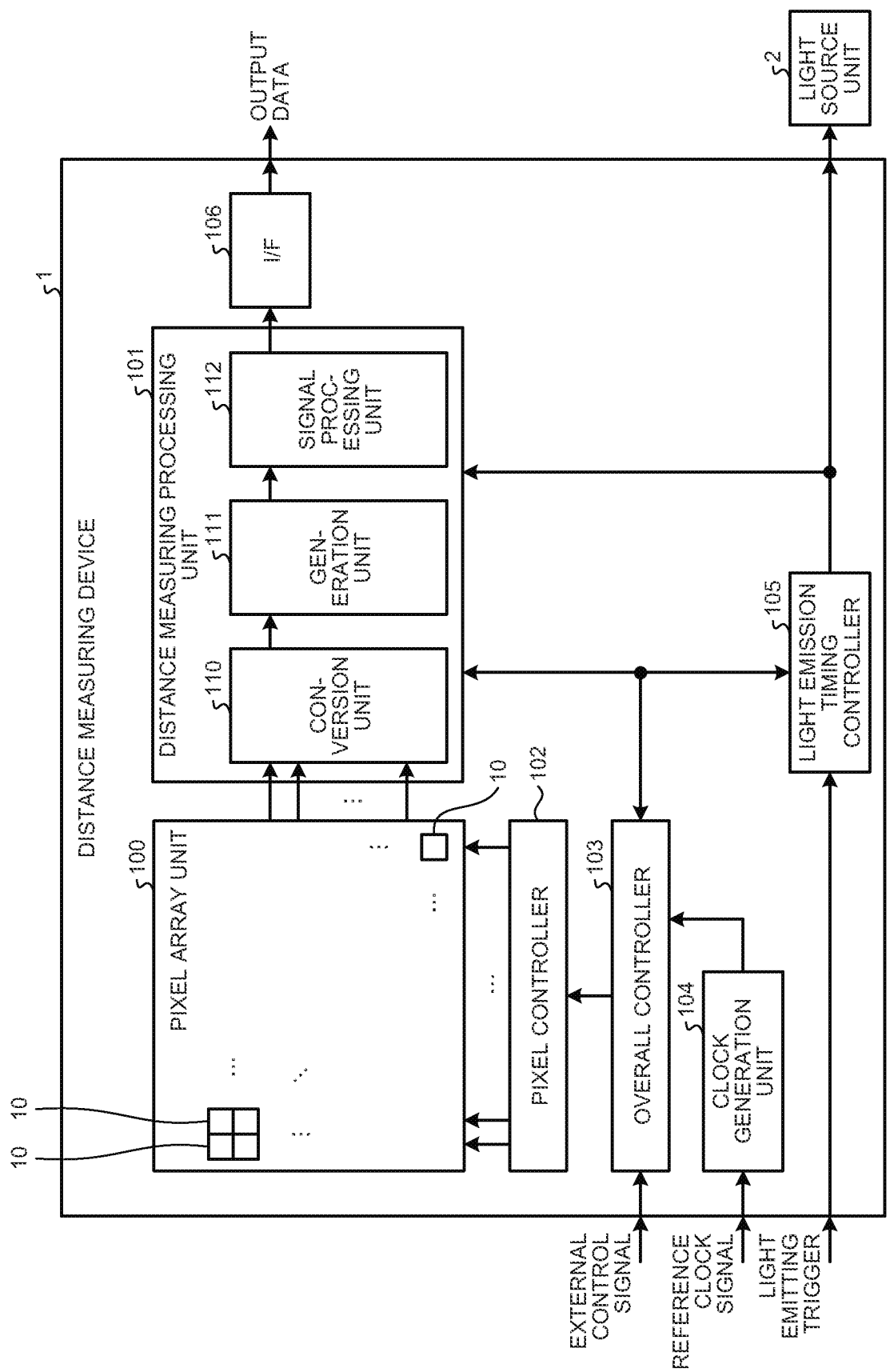
FIG. 4 is a block diagram illustrating in more detail the configuration of an example of a distance measuring device applicable to the embodiment.

FIG. 4 is a block diagram illustrating in more detail the configuration of an example of the distance measuring device 1 applicable to each embodiment. In FIG. 4, the distance measuring device 1 includes a pixel array unit 100, a distance measuring processing unit 101, a pixel controller 102, an overall controller 103, a clock generation unit 104, a light emission timing controller 105, and an interface (I/F) 106. The pixel array unit 100, the distance measuring processing unit 101, the pixel controller 102, the overall controller 103, the clock generation unit 104, the light emission timing controller 105, and the interface (I/F) 106 are disposed on, for example, one semiconductor chip.

In FIG. 4, the overall controller 103 controls the overall operation of the distance measuring device 1 according to, for example, a program incorporated in advance. Further, the overall controller 103 can also perform control according to an external control signal supplied from the outside. The clock generation unit 104 generates one or more clock signals used in the distance measuring device 1 based on the reference clock signal supplied from the outside. The light emission timing controller 105 generates a light emission control signal indicating the light emission timing according to the light emitting trigger signal supplied from the outside. The light emission control signal is supplied to the light source unit 2 and to the distance measuring processing unit 101.

The pixel array unit 100 includes a plurality of pixels 10, 10, . . . each of which includes a light receiving element, which are disposed in a two-dimensional lattice pattern. The operation of each pixel 10 is controlled by the pixel controller 102 according to the instruction of the overall controller 103. For example, the pixel controller 102 may control the reading of the pixel signal from each pixel 10 for each block including (p×q) pixels 10 with p pixels in the row direction and q pixels in the column direction. Further, the pixel controller 102 can scan respective pixels 10 in the row direction and further scan them in the column direction with the block as a unit to read a pixel signal from each pixel 10. Not limited to this, the pixel controller 102 can also control each pixel 10 independently. Further, the pixel controller 102 can set a predetermined region of the pixel array unit 100 as a target region, and can set the pixels 10 included in the target region as the target pixels 10 from which a pixel signal is to be read. Furthermore, the pixel controller 102 can collectively scan a plurality of rows (plural lines), further perform scanning in the column direction, and read a pixel signal from each pixel 10.

In the following, scanning refers to a process in which the light source unit 2 (see FIG. 4) is made to emit light, and the signal Vpls, corresponding to the light received, from the pixel 10 is continuously read for each pixels 10 designated as a scanning target in one scan region. It is possible to perform a plurality numbers of times of light emission and reading in one time scan.

The pixel signal read from each pixel 10 is supplied to the distance measuring processing unit 101. The distance measuring processing unit 101 includes a conversion unit 110, a generation unit 111, and a signal processing unit 112.

The pixel signal read from each pixel 10 to output from the pixel array unit 100 is supplied to the conversion unit 110. Here, the pixel signal is asynchronously read from each pixel 10 and supplied to the conversion unit 110. That is, the pixel signal is read from the light receiving element and is output according to the timing at which light is received by each pixel 10.

The conversion unit 110 converts the pixel signal supplied from the pixel array unit 100 into digital information. That is, the pixel signal supplied from the pixel array unit 100 is output corresponding to the timing when light is received by the light receiving element included in the pixel 10 corresponding to the pixel signal. The conversion unit 110 converts the supplied pixel signal into time information indicating the timing.

The generation unit 111 generates a histogram based on the time information in which the pixel signal is converted by the conversion unit 110. Here, the generation unit 111 counts the time information based on the unit time d set by a setting unit 113 to generate the histogram. The details of the histogram generation process by the generation unit 111 will be described later.

The signal processing unit 112 performs the predetermined arithmetic process based on the data of the histogram generated by the generation unit 111, and calculates, for example, distance information. The signal processing unit 112 creates a curve approximation of the histogram based on, for example, the data of the histogram generated by the generation unit 111. The signal processing unit 112 can detect the peak of the curve to which this histogram approximates and obtain the distance D based on the detected peak.

When the signal processing unit 112 performs a curve approximation of the histogram, the signal processing unit 112 can perform a filter process to the curve to which the histogram approximates. For example, the signal processing unit 112 can suppress a noise component by performing a low pass filter process on a curve to which the histogram approximates.

The distance information obtained by the signal processing unit 112 is supplied to an interface 106. The interface 106 outputs the distance information supplied from the signal processing unit 112 to the outside as output data. For example, a mobile industry processor interface (MIPI) can be used as the interface 106.

In the above description, the distance information obtained by the signal processing unit 112 is output to the outside via the interface 106, but the embodiment is not limited to this example. That is, the histogram data, which is data of the histogram generated by the generation unit 111, may be output from the interface 106 to the outside. In this case, the information indicating the filter coefficient can be omitted from the distance measurement condition information set by the setting unit 113. The histogram data output from the interface 106 is supplied to, for example, an external information processing device, and is appropriately processed.

Figure 5:
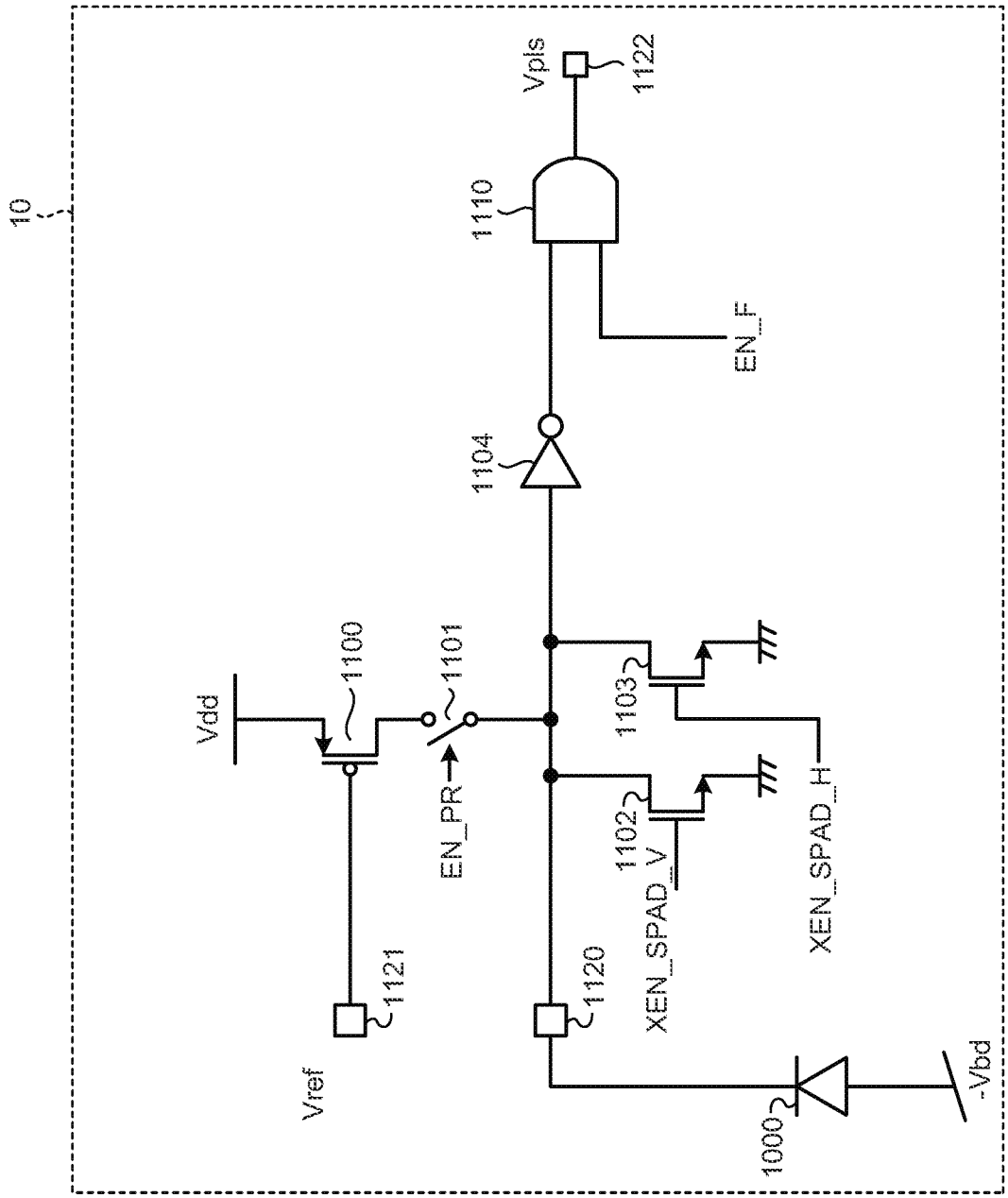
FIG. 5 is a diagram illustrating a basic configuration example of a pixel circuit applicable to the embodiment.

FIG. 5 is a diagram illustrating a basic configuration example of the pixel 10 applicable to each embodiment. In FIG. 5, the pixel 10 includes a light receiving element 1000, transistors 1100, 1102, and 1103, an inverter 1104, a switch unit 1101, and an AND circuit 1110.

The light receiving element 1000 converts the incident light into an electrical signal by photoelectric conversion to output the signal. In each embodiment, the light receiving element 1000 converts the incident photon (photon) into an electrical signal by photoelectric conversion to output a pulse corresponding to the entry of the photon. In each embodiment, a single photon avalanche diode is used as the light receiving element 1000. Hereinafter, the single photon avalanche diode is referred to as a single photon avalanche diode (SPAD). The SPAD has the characteristic in which when a large negative voltage that causes avalanche multiplication is applied to the cathode, the electrons generated in response to the entry of one photon cause avalanche multiplication and a large current flows. By utilizing this characteristic of the SPAD, it is possible to detect the entry of one photon with high sensitivity.

In FIG. 5, the light receiving element 1000, which is a SPAD, has a cathode connected to a coupling unit 1120 and an anode connected to a voltage source of the voltage (−Vbd). The voltage (−Vbd) is a large negative voltage that generates an avalanche multiplication for the SPAD. The coupling unit 1120 is connected to one end of the switch unit 1101 whose on (closed) and off (open) are controlled according to a signal EN_PR. The other end of the switch unit 1101 is connected to the drain of a transistor 1100, which is a P-channel metal oxide semiconductor field effect transistor (MOSFET). The source of the transistor 1100 is connected to a power supply voltage Vdd. Further, a coupling unit 1121 to which a reference voltage Vref is supplied is connected to the gate of the transistor 1100.

The transistor 1100 is a current source that outputs a current corresponding to the power supply voltage Vdd and the reference voltage Vref from the drain. With such a configuration, a reverse bias is applied to the light receiving element 1000. When a photon is incident on the light receiving element 1000 with the switch unit 1101 turned on, the avalanche multiplication is started and a current flows from the cathode toward the anode of the light receiving element 1000.

The signal extracted from the connection point between the drain of the transistor 1100 (one end of the switch unit 1101) and the cathode of the light receiving element 1000 is input to the inverter 1104. The inverter 1104 performs, for example, a threshold value determination on the input signal, inverts the signal each time the signal exceeds the threshold value in the positive direction or the negative direction to output the signal as the signal Vpls, which is a pulsed output signal.

The signal Vpls output from the inverter 1104 is input to the first input port of the AND circuit 1110. A signal EN_F is input to the second input port of the AND circuit 1110. The AND circuit 1110 outputs the signal Vpls from the pixel 10 via a terminal 1122 when both the signal Vpls and the signal EN_F are in the high state.

In FIG. 5, the coupling unit 1120 is further connected to the drains of transistors 1102 and 1103, each of which is an N-channel MOSFET. The sources of the transistors 1102 and 1103 are connected, for example, to the ground potential. A signal XEN_SPAD_V is input to the gate of the transistor 1102. A signal XEN_SPAD_H is input to the gate of the transistor 1103. When at least one of these transistors 1102 and 1103 is in the off state, the cathode of the light receiving element 1000 is forcibly set to the ground potential, and the signal Vpls is set in the low state.

The signals XEN_SPAD_V and XEN_SPAD_H are used as vertical and horizontal control signals, respectively, in a two-dimensional lattice pattern in which respective pixels 10 are disposed in the pixel array unit 100. As a result, the on/off state of each pixel 10 included in the pixel array unit 100 can be controlled for each pixel 10. The on state of the pixel 10 is a state in which the signal Vpls can be output, and the off state of the pixel 10 is a state in which the signal Vpls cannot be output.

For example, in the pixel array unit 100, the signal XEN_SPAD_H is set to the state in which the transistor 1103 is turned on for consecutive q columns of the two-dimensional lattice, and the signal XEN_SPAD_V is set to the state in which the transistor 1102 is turned on for consecutive p rows. As a result, the output of each light receiving element 1000 can be enabled in a block of p rows×q columns. In addition, since the signal Vpls is output by the AND circuit 1110 from the pixel 10 by the logical product with the signal EN_F, for example, it is possible to control whether the output of each light receiving element 1000 enabled by the signals XEN_SPAD_V and XEN_SPAD_H is enabled/disabled in more detail.

Further, by supplying the signal EN_PR that turns off the switch unit 1101, for example, to the pixel 10 including the light receiving element 1000 whose output is to be disabled, it is possible to stop the supply of the power supply voltage Vdd to the light receiving element 1000, and the pixel 10 can be turned off. This makes it possible to reduce the power consumption of the pixel array unit 100.

These signals XEN_SPAD_V, XEN_SPAD_H, EN_PR, and EN_F are generated by the overall controller 103 based on the parameters stored in the register of the overall controller 103, for example. The parameters may be stored in the register in advance, or may be stored in the register according to an external input. Each of the signals XEN_SPAD_V, XEN_SPAD_H, EN_PR, and EN_F generated by the overall controller 103 is supplied to the pixel array unit 100 by the pixel controller 102.

The control by the signals EN_PR, XEN_SPAD_V, and XEN_SPAD_H using the switch unit 1101 and the transistors 1102 and 1103 described above is performed by using the analog voltage. On the other hand, the control by the signal EN_F using the AND circuit 1110 is performed by using the logic voltage. Therefore, the control by the signal EN_F can be performed at a lower voltage than the control by the signals EN_PR, XEN_SPAD_V, and XEN_SPAD_H, and is easy to handle.

Figure 6:
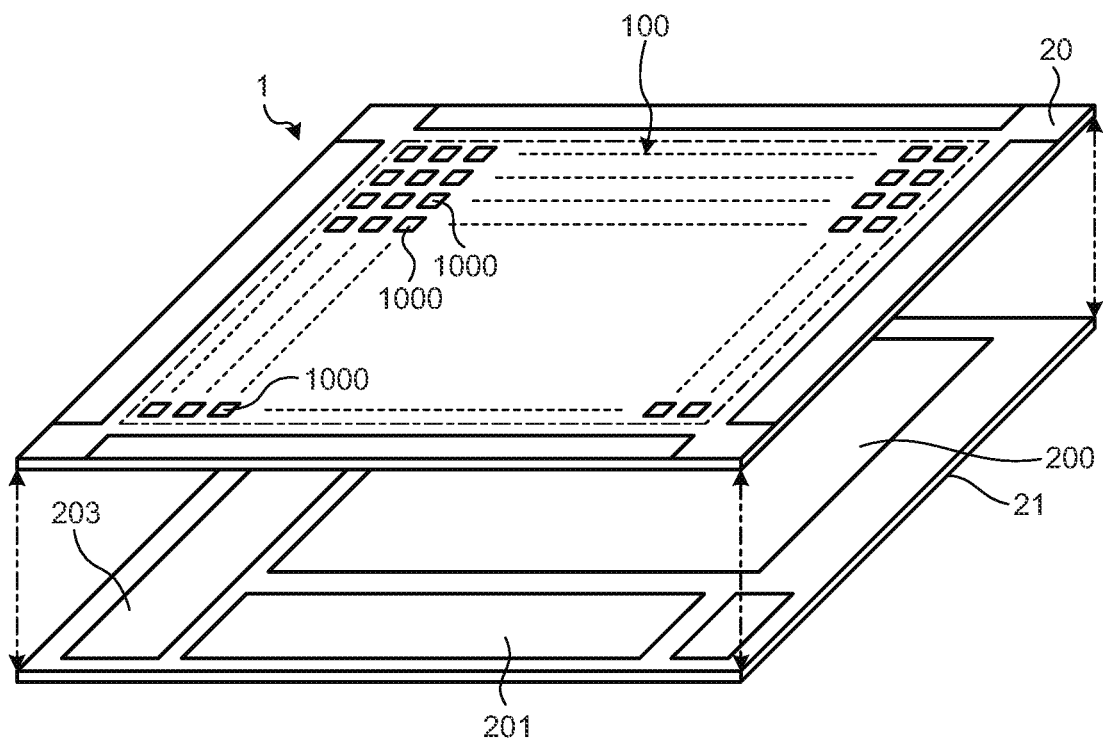
FIG. 6 is a schematic diagram illustrating an example of the configuration of a device applicable to the distance measuring device according to the embodiment.

FIG. 6 is a schematic diagram illustrating an example of a device configuration applicable to the distance measuring device 1 according to each embodiment. In FIG. 6, the distance measuring device 1 is configured by stacking a light receiving chip 20 made of a semiconductor chip, and a logic chip 21. In FIG. 5, for the sake of explanation, the light receiving chip 20 and the logic chip 21 are illustrated in a separated state.

In the light receiving chip 20, the light receiving elements 1000 included in the plurality of respective pixels 10 are disposed in a two-dimensional lattice pattern (matrix) in the region of the pixel array unit 100. Further, in the pixel 10, the transistors 1100, 1102, and 1103, the switch unit 1101, the inverter 1104, and the AND circuit 1110 are formed on the logic chip 21. The cathode of the light receiving element 1000 is connected via, for example, the coupling unit 1120 by a copper-copper connection (CCC) or the like between the light receiving chip 20 and the logic chip 21.

The logic chip 21 is provided with a logic array unit 200 including a signal processing unit that processes a signal acquired by the light receiving element 1000. The logic chip 21 can be further provided with a signal processing circuit unit 201 that processes the signal acquired by the light receiving element 1000, and an element controller 203 that controls the operation as the distance measuring device 1 in close proximity to the logic array unit 200.

For example, the signal processing circuit unit 201 can include the distance measuring processing unit 101 described above. Further, the element controller 203 can include the pixel controller 102, the overall controller 103, the clock generation unit 104, the light emission timing controller 105, and the interface 106 described above.

The configuration on the light receiving chip 20 and the logic chip 21 is not limited to this example. Further, the element controller 203 can be disposed for the purpose of the driving and control of another unit, for example, in the vicinity of the light receiving element 1000, in addition to the control of the logic array unit 200. Other than the arrangement illustrated in FIG. 6, the element controller 203 can be provided in an arbitrary region of the light receiving chip 20 and the logic chip 21 so as to have any functions.

FIG. 7 is a diagram illustrating a more specific configuration example of the pixel array unit 100 according to each embodiment. The pixel controller 102 described with reference to FIG. 4 is illustrated separately as a horizontal controller 102a and a vertical controller 102b in FIG. 7.

In FIG. 7, the pixel array unit 100 includes a total of (x×y) pixels 10 in x columns in the horizontal direction and y rows in the vertical direction. In addition, in FIG. 7 and the similar figures thereafter, the pixel 10 is indicated by the light receiving element 1000 included in the pixel 10 and having a rectangular light receiving face. That is, the pixel array unit 100 includes a configuration in which the light receiving faces of the light receiving elements 1000 as the pixels 10 are disposed in a matrix.

Further, in each embodiment, respective pixels 10 included in the pixel array unit 100 are controlled on a basis of the element 11 including a total of nine pixels 10, three in the horizontal direction and three in the vertical direction. For example, the signal EN_SPAD_H corresponding to the above-mentioned signal XEN_SPAD_H that controls respective pixels 10 in the row direction (horizontal direction), that is, on a column basis, is output from the overall controller 103 as a 3-bit signal (indicated as [2:0]) with the element 11 as a unit, and is supplied to the horizontal controller 102a. That is, by this one 3-bit signal, the signals EN_SPAD_H[0], EN_SPAD_H[1], and EN_SPAD_H[2] for three pixels 10 disposed consecutively in the horizontal direction are merged and transmitted.

In the example of FIG. 7, the signals EN_SPAD_H #0 [2:0], EN_SPAD_H #1 [2:0], ..., and EN_SPAD_H #(x/3) [2:0] are generated by the overall controller 103 in order from the element 11 at the left end of the pixel array unit 100, and are supplied to the horizontal controller 102a. The horizontal controller 102a controls each column of the corresponding element 11 according to the 3-bit value (indicated as [0], [1], [2]) of each signal EN_SPAD_H #0 [2:0], EN_SPAD_H #1 [2:0], ..., and EN_SPAD_H #(x/3) [2:0].

Similarly, for example, the signal EN_SPAD_V corresponding to the above-mentioned signal XEN_SPAD_V that controls respective pixels 10 in the column direction (vertical direction), that is, on a row basis, is output from the overall controller 103 as a 3-bit signal with the element 11 as a unit, and is supplied to the vertical controller 102b. That is, by this one 3-bit signal, the signals EN_SPAD_V [0], EN_SPAD_V [1], and EN_SPAD_V [2] for three pixels 10 disposed consecutively in the vertical direction are merged and transmitted.

In the example of FIG. 7, the signals EN_SPAD_V #0 [2:0], EN_SPAD_V #1 [2:0], ..., and EN_SPAD_V #(y/3) [2:0] are generated by the overall controller 103 in order from the element 11 at the lower end of the pixel array unit 100, and are supplied to the vertical controller 102b. The vertical controller 102b control each row of the corresponding element 11 according to the 3-bit value of each signal EN_SPAD_V #0 [2:0], EN_SPAD_V #1 [2:0], ..., and EN_SPAD_V #(y/3) [2:0].

Although not illustrated, for example, similar to the signal EN_SPAD_V above, the signal EN_PR is output from the overall controller 103 as a 3-bit signal with the element 11 as a unit, and is supplied to the vertical controller 102b. The vertical controller 102b controls each row of the corresponding element according to the 3-bit value of each signal EN_PR.

Figure 8A:
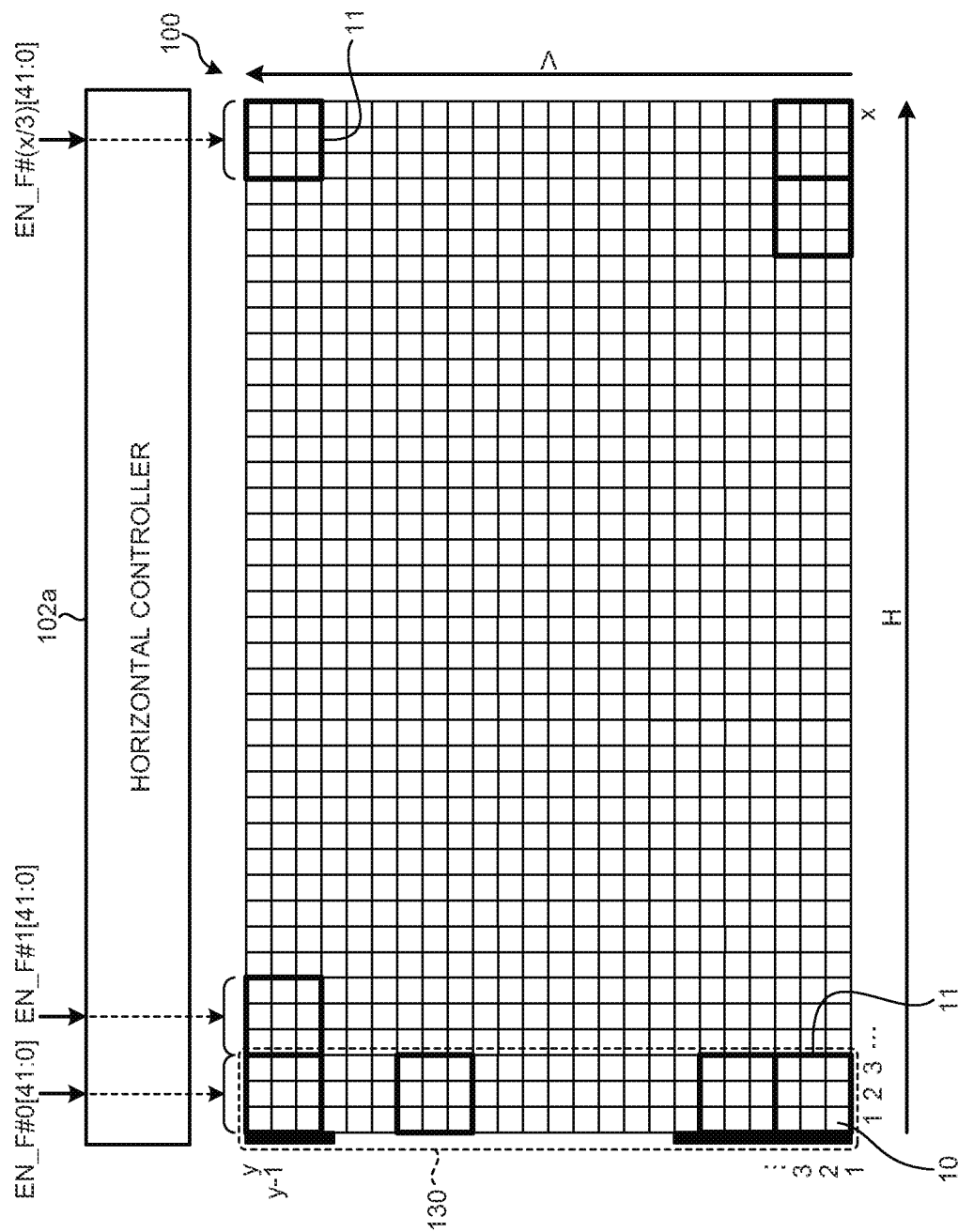
FIG. 8A is a diagram illustrating an example of a detailed configuration of the pixel array unit according to the embodiment.
Figure 8B:
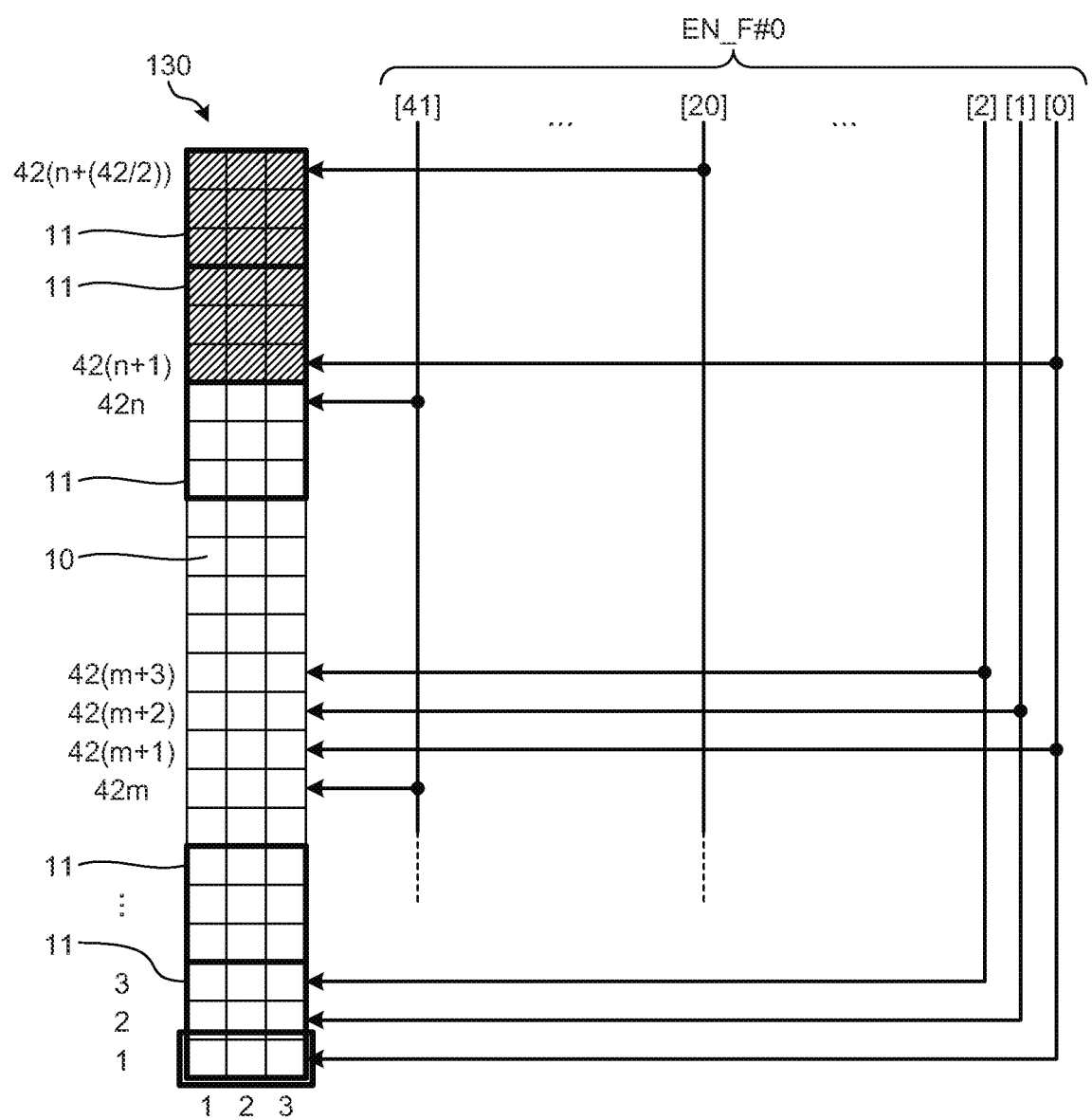
FIG. 8B is a diagram illustrating an example of a detailed configuration of the pixel array unit according to the embodiment.

FIGS. 8A and 8B are diagrams illustrating an example of the detailed configuration of the pixel array unit 100 according to each embodiment. More specifically, FIGS. 8A and 8B illustrate control by the signal EN_F.

As illustrated in FIG. 8A, the signal EN_F is a signal supplied for a control target 130 including a plurality of adjacent columns of the pixel array unit 100. Here, the control target 130 is illustrated as including three columns that match the size of the element 11. Further, as the signal EN_F, the same signal is supplied to each row included in the control target 130 for each row with a predetermined cycle. That is, in this example in which the control target 130 includes three columns, the same signal EN_F is supplied to the three pixels 10 in the same row. In FIG. 8A, as an example, the signal EN_F is a 42-bit (indicated as [41:0]) signal, and is illustrated as the same signal being supplied every 42 rows (7 rows×6). In the example of FIG. 8A, the signals EN_F #0 [41:0], EN_F #1 [41:0], ..., and EN_F #(x/3) [41:0] are output by the overall controller 103 from the left end of the pixel array unit 100 every three columns, and are supplied to the horizontal controller 102a.

The horizontal controller 102a supplies each bit of respective signals EN_F #0 [41:0], EN_F #1 [41:0], ..., and EN_F #(x/3) [41:0] to each row of the corresponding control target 130. As illustrated in FIG. 8B, the horizontal controller 102a supplies the signal EN_F #0 [0] to, for example, the control target 130 at the left end of the pixel array unit 100 every 42 rows, such as the first row, the 42 (m+1)th row (where m is an integer of one or more), ..., the 42 (n+1)th row, . . . . Similarly, the horizontal controller 102a supplies the signal EN_F #0 [2] to the second row, the 42 (m+2)th row, . . . every 42 rows. In FIG. 8B, the signal EN_F #0 is supplied to the row of the control target 130 at the upper end, which corresponds to the first half of the unit of 42 rows.

That is, by this 42-bit signal EN_F[41:0], the signals EN_F[0], EN_F[1], . . . , and EN_F for 42 sets, of three pixels 10 disposed consecutively in the horizontal direction, which are disposed consecutively in the vertical direction are merged and transmitted.

In this way, it is possible to control the pixel array unit 100 differently for a plurality of columns by the signal EN_F. Further, the plurality of columns of the pixel array unit 100 is supplied with the same signal EN_F for a plurality of rows. Therefore, it is possible to control the respective pixels 10 included in the pixel array unit 100 with the plurality of rows as a cycle, with the plurality of rows as the minimum unit in the width direction.

Figure 9:
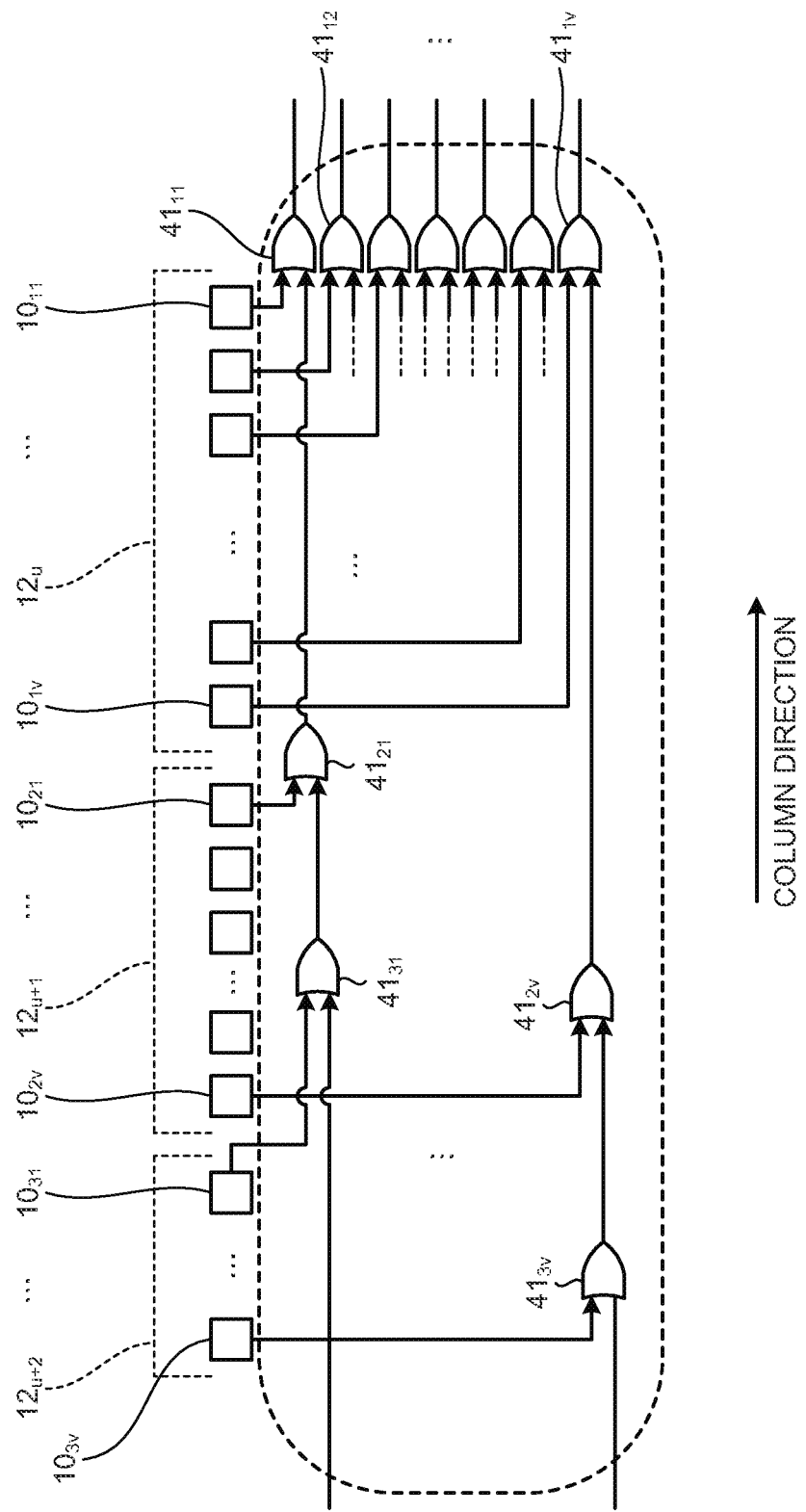
FIG. 9 is a diagram illustrating an example of a configuration for reading a signal Vpls from each pixel circuit according to the embodiment.

FIG. 9 is a diagram illustrating an example of a configuration for reading the signal Vpls from each pixel 10 according to each embodiment. In FIG. 9, as indicated by the arrow in the figure, the horizontal direction of the figure is the column direction.

In each embodiment, a read line for reading the signal Vpls is shared for a predetermined number of pixels 10 in the column direction. In the example of FIG. 9, the read line is shared for the v pixels 10. For example, consider groups $12_u$, $12_{u+1}$, $12_{u+2}$, . . . each of which includes the v pixels 10 disposed in a row. The group $12_u$ includes the pixels $10_{11}$ to $10_{1v}$, the group $12_{u+1}$ includes the pixels $10_{21}$ to $10_{2v}$, and the group $12_{u+2}$ includes the pixels $10_{31}$ to $103_v$, . . . .

In the respective groups $12_u$, $12_{u+1}$, $12_{u+2}$, . . . , the read lines of the pixels 10 in which positions in the groups correspond are shared. In the example of FIG. 9, when the right side of the figure is regarded as the beginning of the position, the read lines of the first pixel $10_{11}$ of the group $12_u$, the first pixel $10_{21}$ of the group $12_{u+1}$, the first pixel $10_{31}$ of the group $12_{u+2}$, . . . are shared. In the example of FIG. 9, a plurality of read lines of respective pixels $10_{11}$, $10_{21}$, $10_{31}$, . . . are sequentially connected to each other via OR circuits $41_{11}$, $41_{21}$, $41_{31}$, . . . , respectively, to share the plurality of read lines.

For example, for the group $12_u$, the pixels $10_{11}$ to $101_v$ included in group $12_u$ are provided with respective OR circuits $41_{11}$, $41_{12}$, . . . , and $41_{1v}$, and the read lines of the pixels $10_{11}$ to $10_{1v}$ is connected to respective first input ports. Similarly for the group $12_{u+1}$, the pixels $10_{21}$ to $10_{2v}$ included in the group $12_{u+1}$ are provided with OR circuits $41_{21}$ to $41_{2v}$, respectively. Similarly for the group $12_{u+2}$, the pixels $10_{31}$ to $10_{3v}$ included in the group $12_{u+2}$ are provided with OR circuits $41_{31}$ to $41_{3v}$, respectively.

The output of each of the OR circuits $41_{11}$ to $41_{1v}$ is input to, for example, the distance measuring processing unit 101.

Taking the pixels $10_{11}$, $10_{21}$, and $10_{31}$ as an example, the read line of the pixel $10_{11}$ is connected to the first input port of the OR circuit $41_{11}$, and the output of the OR circuit $41_{21}$ is connected to the second input port. The read line of pixel $10_{21}$ is connected to the first input port of the OR circuit $41_{21}$, and the output of the OR circuit $41_{31}$ is connected to the second input port. The same applies to the OR circuit $41_{31}$ and subsequent circuits.

For the configuration illustrated in FIG. 9, for example, the vertical controller 102b performs control so that simultaneous reading from respective pixels 10 in which positions correspond in the respective groups $12_u$, $12_{u+1}$, $12_{u+2}$, . . . is not performed by using the signal EN_SPAD_V. In other words, the vertical controller 102b controls so as to perform reading from only one pixel 10 of a plurality of pixels 10 disposed every (v−1) pixels in a row. In the example of FIG. 9, the vertical controller 102b performs control so that, for example, simultaneous reading from the pixel $10_{11}$, the pixel $10_{21}$, and the pixel $10_{31}$ is not performed. Not limited to this, the control of simultaneous reading in the column direction can also be performed by the horizontal controller 102a using the signal EN_F.

On the other hand, in the configuration illustrated in FIG. 9, the vertical controller 102b can designate simultaneous reading from v pixels 10 disposed consecutively in the column. At this time, the vertical controller 102b can designate the pixels 10 from which reading is to be performed at the same time across the groups $12_u$, $12_{n+1}$, $12_{u+2}$, . . . . That is, in the configuration illustrated in FIG. 9, v consecutive pixels 10 in the column direction can be read at the same time. For example, it is possible to designate simultaneous reading from v pixels 10 disposed consecutively from the third pixel $10_{13}$ from the beginning included in the group $12_u$ to the second pixel $10_{22}$ from the beginning included in the group $12_{u+1}$.

Further, when the vertical controller 102b designates simultaneous reading from v pixels 10 disposed continuously in a column, the vertical controller 102b controls so as not to perform reading from the other pixels 10 in the column. Therefore, for example, the output of the OR circuit $41_{11}$ is the signal Vpls read from any one pixel 10 of the pixels $10_{11}$, $10_{21}$, $10_{31}$, . . . .

In this way, by connecting the read line of each pixel 10 and performing read control on each pixel 10, it is possible to reduce the number of read lines on a column basis.

Example of Pixel Array Scanning Method Using Existing Technology

Figure 10:
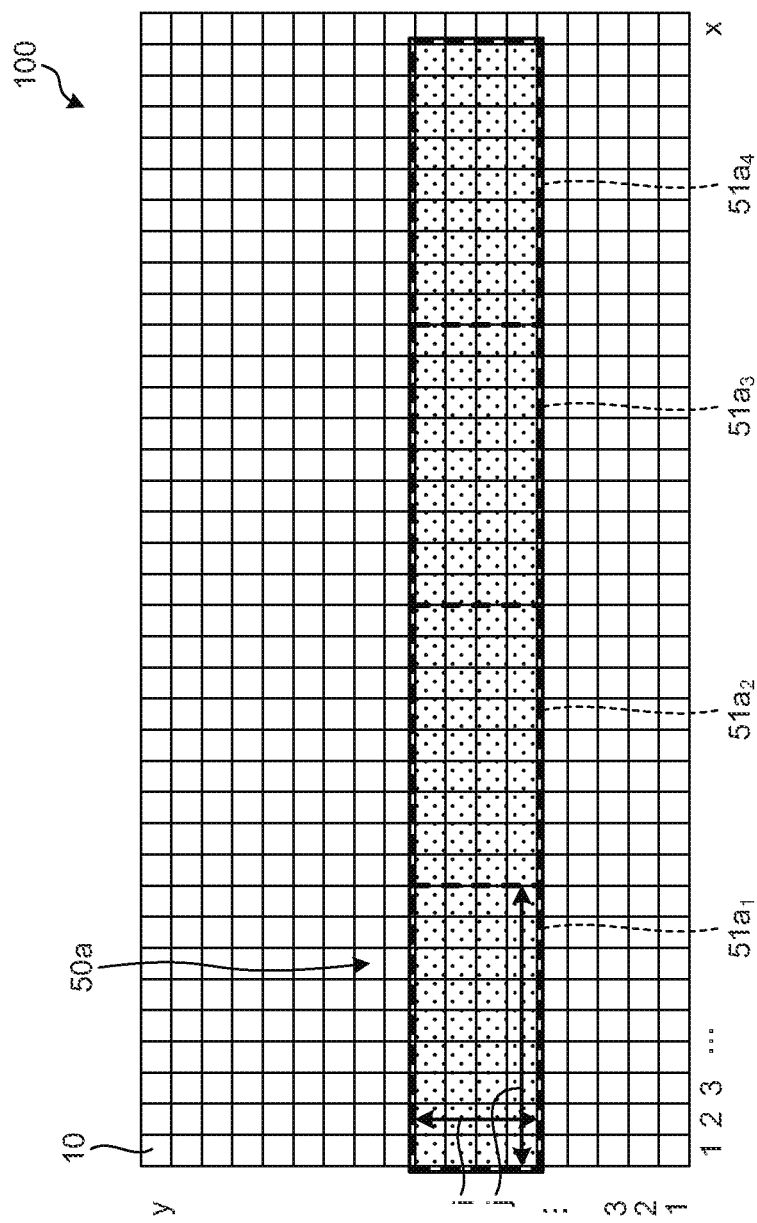
FIG. 10 is a diagram for explaining a method of scanning a pixel array unit by an existing technique.

Next, prior to the description of the present disclosure, a method of scanning the pixel array unit 100 by the existing technique will be schematically described. FIG. 10 is a diagram for explaining a method of scanning the pixel array unit 100 by the existing technique.

In the example of FIG. 10, in the pixel array unit 100, each block $51a_1$, $51a_2$, $51a_3$, and $51a_4$ includes a total of (i×j) pixels 10 with i pixels in the column direction (height i) and j pixels in the row direction (width j). Scanning is performed on a scan region 50a including the blocks $51a_1$, $51a_2$, $51a_3$, and $51a_4$ aligned in the row direction of the pixel array unit 100.

With reference to FIG. 4, the distance measuring processing unit 101 converts by the conversion unit 110, for example, each signal Vpls output from the pixels 10 included in the block $51a_1$ at each time of the light reception timing. The generation unit 111 adds the time information obtained by converting the signal Vpls by the conversion unit 110 in each predetermined time range to generate a histogram. That is, the block $51a_1$ represents an addition unit for adding time information when generating a histogram. Based on this histogram, the distance information at the representative position of the block $51a_1$ (for example, the center position of the block $51a_1$) can be acquired.

For example, the overall controller 103 performs the process for the block $51a_1$ on the blocks $51a_1$, . . . , and $51a_4$ aligned in the row direction of the target region in the pixel array unit 100. The target region is, for example, a region in which enabled pixels 10 are disposed in the pixel array unit 100. In this way, scanning is performed on the scan region where the height in the column direction matches the height of the block $51a_1$ in the column direction and the width in the row direction matches the width of the target region. As a result, the distance information at the representative position of each block $51a_1, \ldots,$ and $51a_4$ can be obtained. This scanning is repeatedly performed while changing the position of the scan region $50a$ in the column direction of the target region on a scan region basis, and the distance information at each representative position in the target region in the pixel array unit 100 is acquired.

When the SPAD is used for the light receiving element 1000 of the pixel 10, the SPAD requires a relatively high voltage for driving. Therefore, from the viewpoint of power consumption and circuit scale, the size of the scan region $50a$ for which reading is performed at one time has an upper limit. In addition, when the scanning in one scan region $50a$ is completed, and the next scanning is performed after the scan region $50a$ is moved in the column direction, the scan may be affected by the heat or the like of each light receiving element 1000 in the scan region where the scanning was performed immediately before. In addition, faster scanning for the entire target region may be required.

First Embodiment

Next, the first embodiment will be described. In the first embodiment, of the pixels 10 included in the target region of the pixel array unit 100, the target pixels, each of which is a pixel 10 from which the pixel signal is read, are thinned out and designated with the pixel 10 as a unit. The target pixels thinned out and designated are scanned for each block in the scan region to obtain distance information.

Figure 11:
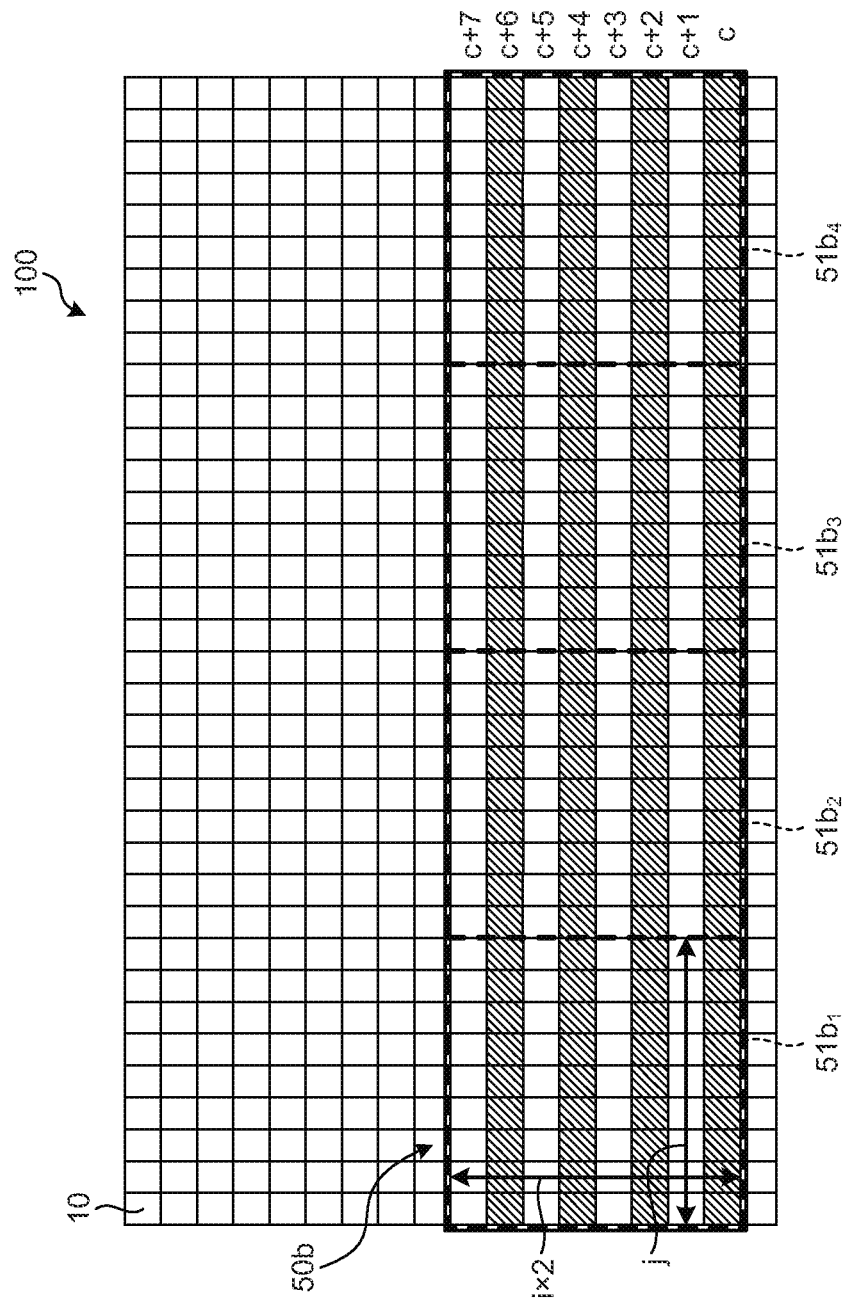
FIG. 11 is a diagram for explaining a method of scanning a pixel array unit according to the first embodiment.

FIG. 11 is a diagram for explaining a method of scanning the pixel array unit 100 according to the first embodiment. In FIG. 11, a scan region $50b$ includes four blocks $51b_1$, $51b_2$, $51b_3$, and $51b_4$. In this example, each block $51b_1$ to $51b_4$ includes (i×2) rows of the array of respective pixels 10 in the pixel array unit 100, and has a height (i×2) in the column direction. Each block $51b_1$ to $51b_4$ has a width j corresponding to j pixels 10 in the row direction, as in FIG. 10 described above.

Here, each block $51b_1$ to $51b_4$ is designated by thinning out the target pixels from which the pixel signal is read by one row. More specifically, each block $51b_1$ to $51b_4$ includes eight pixels 10 in the column direction (height (i×2)=4×2), and respective pixels 10 disposed in the c-th row, the (c+2)th row, the (c+4)th row, and the (c+6)th row are designated as the target pixel from which reading is performed. On the other hand, respective pixels 10 disposed in the (c+1)th row, the (c+3)th row, the (c+5)th row and the (c+7)th row are not designated as the target pixel.

With reference to FIGS. 4 and 7, for example, the overall controller 103 generates the signal EN_SPAD_V that designates on (read)/off (non-read) of respective rows included in the scan region $50b$ every other row, and generates the signal EN_SPAD_H that designates respective columns to turn on. The overall controller 103 passes the generated signals EN_SPAD_V and EN_SPAD_H to the vertical controller $102b$ and the horizontal controller $102a$, respectively.

Based on the passed signal EN_SPAD_V, the vertical controller $102b$ generates the signal XEN_SPAD_V, for each row, that turns on and off the rows every other row to supply the signal XEN_SPAD_V to the pixel array unit 100. Based on the passed signal EN_SPAD_H, the horizontal controller $102a$ generates the signal XEN_SPAD_H, for each column, that turns on respective columns included in the target region to supply the signal XEN_SPAD_H to the pixel array unit 100.

Figure 12:
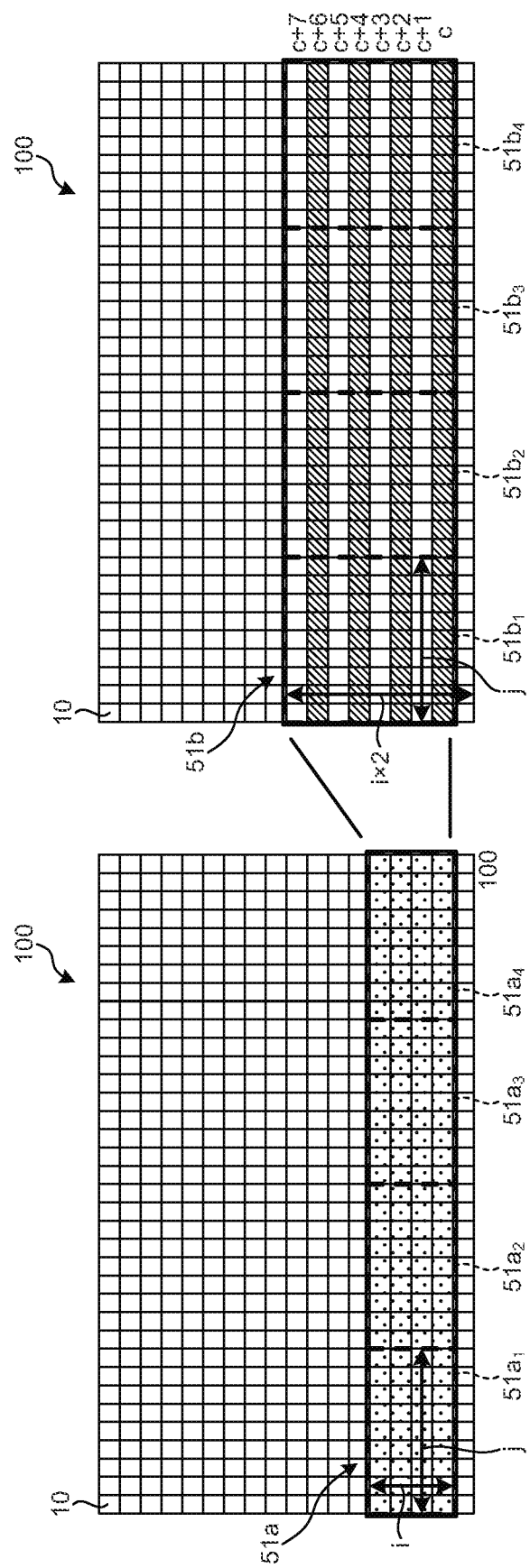
FIG. 12 is a diagram illustrating a comparison between a target pixel designated by the scanning method according to the first embodiment and a target pixel designated by the scanning method according to an existing technique.

FIG. 12 is a diagram illustrating a comparison between the target pixel designated by the scanning method according to the first embodiment and the target pixel designated by the scanning method according to the existing technique described with reference to FIG. 10. On the left side of FIG. 12, an example of the target pixel designated by the scanning method according to the existing technique is illustrated. Further, on the right side of FIG. 12, an example of the target pixel designated by the scanning method according to the first embodiment is illustrated.

Here, in the figure related to the existing technology on the left side of FIG. 12, the scan region $50a$ includes four rows (height i=4). That is, each of the blocks $51a_1$ to $51a_4$ included in the scan region $50a$ has a predetermined width j in the row direction and includes four rows in the column direction. Therefore, each block $51a_1$ to $51a_4$ includes (i×j) target pixels.

On the other hand, in the figure according to the first embodiment on the right side of FIG. 12, the scan region $50b$ includes 8 rows (height (i×2)). That is, each block $51b_1$ to $51b_4$ included in the scan region $50b$ has a predetermined width w in the row direction and includes eight rows in the column direction. Here, thinning is performed on each block $51b_1$ to $51b_4$ every other row. Therefore, each of the blocks $51b_1$ to $51b_4$ includes (i×j) target pixels, which are the same as those of each of the blocks $51a_1$ to $51a_4$ by the scanning method according to the existing technology.

In this way, the number of target pixels included in the addition unit that generates the histogram is equalized between the case where thinning is performed and the case where thinning is not performed. As a result, for example, the process in each unit (conversion unit 110, generation unit 111, and signal processing unit 112) of the distance measuring processing unit 101 can be standardized between the case where the thinning is performed and the case where the thinning is not performed.

In the example of the scanning method according to the first embodiment illustrated on the right side of FIGS. 11 and 12, the target pixels are thinned out every other row and designated. For this reason, for example, the block $51b_1$ according to the first embodiment has the same number of the target pixels included as, for example, the block $51a_1$ in the case where thinning is not performed, while having a doubled height (number of rows) in the column direction on which scanning is performed.

Therefore, by performing thinning by the scanning method according to the first embodiment, the target region in the pixel array unit 100 can be performed at a higher speed than the target region when thinning is not performed. Further, by performing the thinning, it is possible to acquire distance information of a range wider than that when the thinning is not performed or acquire distance information of the same range with power consumption less than that when the thinning is not performed.

The distance measuring device 1 according to the first embodiment can switch between a first mode in which scanning by the target pixel designated after performing thinning is performed, and a second mode in which scanning by the target pixel designated without performing thinning is performed.

For example, the overall controller 103 sets, in response to an instruction, from the outside, as to whether to perform the first mode or the second mode, appropriately signals EN_SPAD_H, EN_SPAD_V, EN_PR, and the like according to the instructed mode of the first and second modes and passes them to the horizontal controller $102a$ and the vertical controller $102b$. The horizontal controller $102a$ and the vertical controller 102b designate the scan region and the target pixel in the scan region according to the signals EN_SPAD_H, EN_SPAD_V, EN_PR, and the like.

Here, when thinning is performed, the number of target pixels per area is reduced, the interval between the representative positions where the distance information is acquired is increased, and the resolution of the distance information is lowered, as compared with the case where the thinning is not performed. Therefore, there is a trade-off relationship between the scanning speed and power consumption, and the resolution when thinning is performed. Therefore, it is preferable to appropriately switch between the first mode and the second mode according to the purpose of distance measurement and the like.

The number of target pixels in each block when thinning is performed and the number of target pixels in each block when thinning is not performed do not necessarily have to be the same number. In this case, in order to maintain the consistency of the distance measurement results in distance measurement when thinning is performed and distance measurement when thinning is not performed, it is preferable that the number of target pixels of each block when thinning is performed and the number of target pixels of each block when thinning is not performed have substantially the same number. For example, the number of target pixels of each block when thinning is performed is such that the distance measurement result of distance measurement when thinning is performed is within an allowable error range with respect to the distance measurement result when thinning is not performed.

Mitigation of Influence From Adjacent Blocks by Thinning According to First Embodiment By thinning out the target pixels according to the first embodiment, it is possible to mitigate the influence of heat and the like received from adjacent blocks. FIG. 13 is a diagram for explaining mitigation of the influence from the adjacent block by thinning out the target pixels according to the first embodiment.

Consideration is made in which after scanning the scan region 50b illustrated in FIG. 13, scanning is performed on the scan region including the block $51b_4'$ which is adjacent, in the column direction, to the block $51b_4$ included in the scan region 50b. In the blocks $51b_4$ and $51b_4'$, respective pixels 10 disposed in the first row, the third row, the fifth row, and the seventh row from the lower end are designated as target pixels. On the other hand, respective pixels 10 disposed in the second row, the fourth row, the sixth row, and the eighth row from the lower end are not designated as target pixels. It is assumed that the supply of the power supply voltage Vdd to the light receiving element 1000 is stopped for the respective pixels 10 that are not designated as the target pixels, for example, by controlling by the signal EN_PR.

In this case, respective pixels 10 disposed at the first row, which is the lower end row of the block $51b_4'$ are designated as the target pixels. On the other hand, in the eighth row, which is the upper end row of the block $51b_4$, included in the scan region 50b where the operation was completed immediately before, which is adjacent to the first row, respective pixels 10 disposed are not designated as the target pixels, and the supply of the power supply voltage Vdd is stopped.

In this way, by performing thinning on a row basis, for example, a row in which respective pixels 10 that are not designated as target pixels and to which the supply of the power supply voltage Vdd is stopped are disposed can be disposed at the boundary between block $51b_4'$, which is currently being scanned, and block $51b_4$, which was scanned immediately before. Therefore, it is possible to mitigate the influence of the heat generated by respective pixels 10 of the block $51b_4$ due to the immediately preceding scan on the block $51b_4'$, which is to be scanned.

Reading of Signal Vpls From Respective Pixels 10 According to First Embodiment

Next, the reading process of the signal Vpls from respective pixels 10 according to the first embodiment will be described. In the first embodiment, as described with reference to FIG. 9, the read line that reads the signal Vpls is shared every v pixels 10 disposed along the row, and (v−1) pixels 10 disposed consecutively in the column direction can be read at the same time. The thinning corresponding to the sharing of the read line will be described.

Figure 14A:
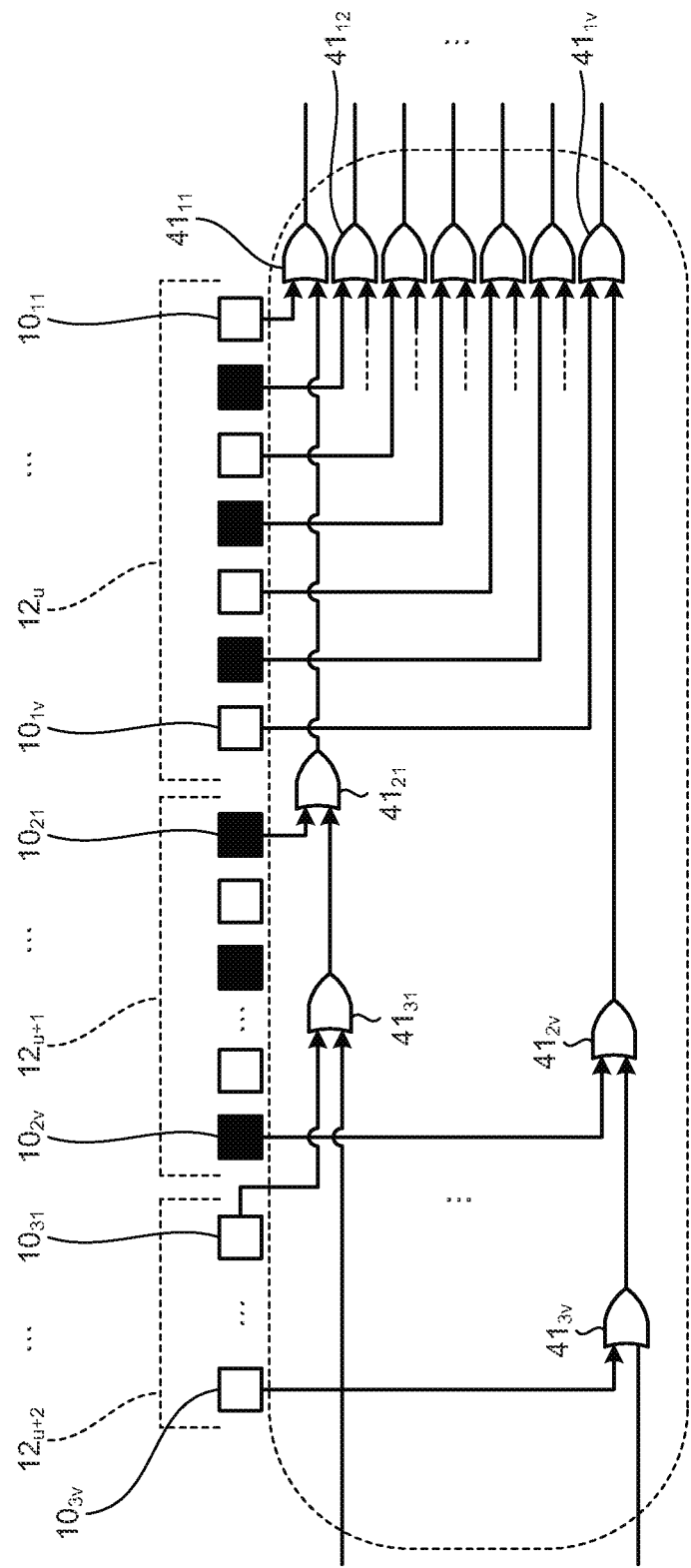
FIG. 14A is a diagram for explaining thinning corresponding to sharing of read lines according to the first embodiment.
Figure 14B:
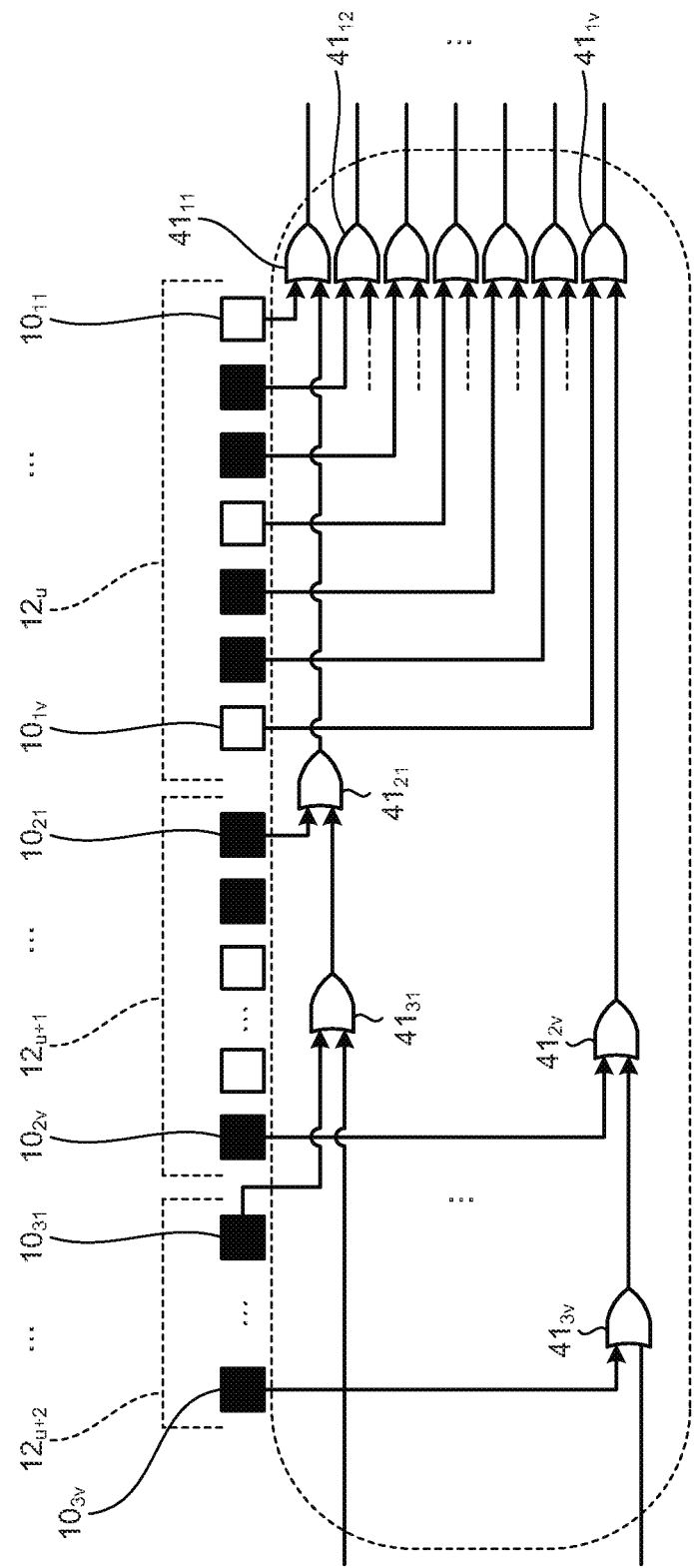
FIG. 14B is a diagram for explaining thinning corresponding to sharing of read lines according to the first embodiment.

FIGS. 14A and 14B are diagrams corresponding to FIG. 9 described above, and are diagrams for explaining thinning corresponding to the sharing of the read line according to the first embodiment. In addition, in FIGS. 14A and 14B, the black square indicates pixels 10 controlled by the vertical controller 102b so that reading from the pixels 10 is not performed, or the pixels 10 are turned off, and the white square indicate pixels 10 that are controlled so that reading from the pixels 10 is performed.

FIG. 14A illustrates an example in which slipping is performed every other row, for example, as in the above-mentioned blocks $51b_1$ to $51b_4$. Here, it is assumed that v=7, the read lines are shared every six (=v−1) pixels 10, and seven pixels 10 can be read simultaneously. Further, it is assumed that, for example, the block $51b_1$ that is thinned out every other row includes eight pixels 10 in the column direction (height (i×2)=8). In this case, the pixels 10 in a row included in block $51b_1$ correspond to, for example, the pixels $10_{11}$ to $10_{1v}$ and the pixel $10_{21}$ in FIG. 14A, and are disposed across the group $12_u$ and the group $12_{u+1}$.

Here, in the example of FIG. 14A, the group $12_u$ includes an odd number of pixels $10_{11}$ to $10_{1v}$. For this reason, in performing thinning every other row, when the initial pixel $10_{11}$ of the group $12_u$ is a target pixel to which reading is designated with the right side of the figure as the beginning of the position in FIG. 14A, target pixels and non-target pixels are disposed alternately such that a pixel 10 adjacent to the left is a non-target pixel to which reading is not designated, a pixel 10 adjacent to the above left is a target pixel, . . . , and the rear end pixel $10_{1v}$ is the target pixel. On the other hand, in the group $12_{u+1}$ adjacent to the group $12_u$, the order of the target pixels and the non-target pixels is reversed relative to the group $12_u$.

In the case of this example in which thinning is performed every other row, the target pixel is designated with two pixels in the column direction as a cycle. Therefore, in 14 pixels 10 with a cycle of seven pixels×2 pixels disposed consecutively in the column direction, that is, in two adjacent groups $12u$ and $12_{u+1}$, reading is performed from any one pixel of a set of pixels 10 in which the read line is shared (for example, a set of pixel $10_{11}$ and pixel $10_{21}$, a set of pixel $10_{1v}$ and pixel $10_{2v}$, . . . ). This also applies to the other pixels 10 included in the group $12u$, the group $12_{u+1}$, . . . .

By designating the rows to be skipped in this way and the pixels 10 from which reading can be performed at the same time, it is possible to perform reading by thinning while sharing the read line.

In the above, an example where thinning is performed every other row is described, but the embodiment is not limited to this example, and it is possible to slip more rows. FIG. 14B illustrates an example in which two rows at a time are skipped for block (for example, block $51a1$) on which thinning is not performed. In this case, the target pixel is designated with three pixels in the column direction as a cycle. Therefore, in 21 pixels 10 with a cycle of seven pixels×three pixels disposed continuously in the column direction, that is, in three adjacent groups $12_u$, $12_{u+1}$, and $12_{u+2}$, reading is performed from any one pixel of a set of pixels 10 in which the read line is shared (for example, a set of pixels $10_{1_1}$, $10_{2_1}$, and $10_{3_1}$, a set of pixels $10_{1_v}$, $10_{2_v}$, and $10_{3_v}$, . . . ). This also applies to the other pixels 10 included in the group $12_u$, the group $12_{u+1}$, the group $12_{u+2}$, . . . .

In the above description, no thinning, thinning of every other row, and thinning of two rows at a time have been described, but the interval of thinning is not limited to these examples. That is, the thinning interval may be another value under the condition that the number of rows to be read after thinned out does not match the interval of the pixels 10 sharing the read line. For example, when the read line is shared at (v−1) intervals in the column direction, the thinning interval can be the interval excluding the (v−1) rows.

Here, for respective pixels 10 disposed continuously in the column, the number of pixels capable of simultaneous reading by sharing the read line is defined as the number of pixels (w+1). Further, a value g when the next reading after reading a row (pixel 10) is performed on the g-th row with the row as a base point is defined as the number of thinning g. For example, when each row is continuously read without performing thinning, the number of thinning g=1. In addition, when thinning is performed every other row as illustrated in FIG. 14A, the number of thinning g=2.

When the number of pixels (w+1) that can be read simultaneously and the number of thinning g are defined in this way, the number of pixels in the maximum read region $S_{MAX}$ where simultaneous reading can be performed is calculated by the following equation (2).

$$S_{MAX}=g\times(w+1) \quad (2)$$

That is, when the number of pixels from which simultaneous reading can be performed is (w+1)=7, and the number of thinning g is one (without thinning), the number of pixels in the maximum read region $S_{MAX}$=1×7=7 (pixels). When the number of thinning g is two (perform thinning every other row), the number of pixels in the maximum read region $S_{MAX}$=2×7=14 (pixels).

Further, the number of the row read lines $R_{CLM}$ that supplies the signal Vpls read from each pixel 10 to each read line in the column direction is obtained by the following equation (3).

$$R_{CLM}=(g\times w)+1 \quad (3)$$

That is, when the number of pixels from which simultaneous reading can be performed is (w+1)=7, and the number of thinning g=one (without performing thinning), the number of row read lines $R_{CLM}$=(1×6)+1=7 (lines). When the number of thinning is g=two (performing thinning every other row), the number of row read lines $R_{CLM}$=(2×6)+1=13 (lines). The number of read lines $R_{CLM}$ indicates that non-target pixels are disposed in a predetermined number of rows at the upper end or the lower end of the block when thinning is performed.

First Modification of First Embodiment

Figure 15:
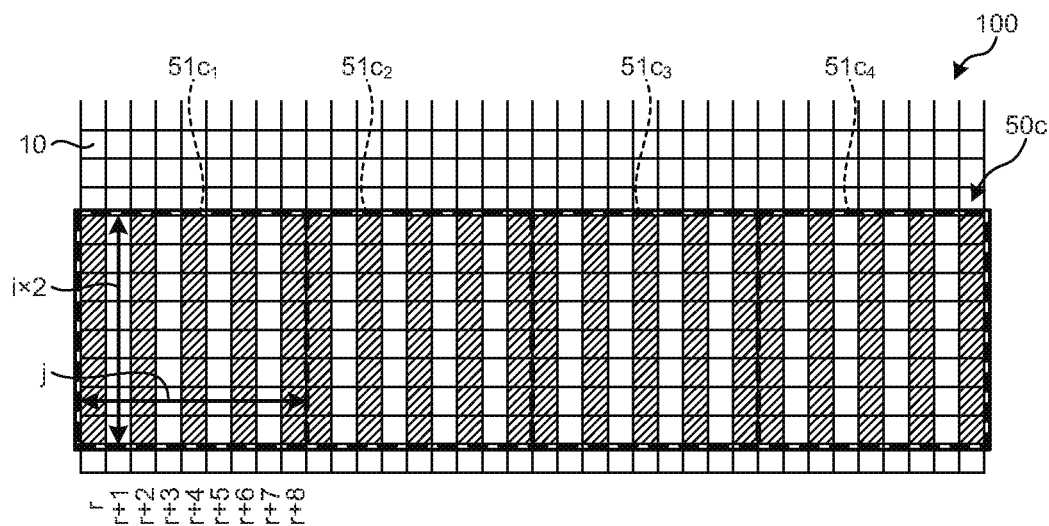
FIG. 15 is a diagram schematically illustrating an example of thinning according to the first modification of the first embodiment.

Next, a first modification of the first embodiment will be described. In the above, thinning is performed on a row basis, that is, in the column direction of the target region in the pixel array unit 100, but the embodiment is not limited to this example. FIG. 15 is a diagram schematically illustrating an example of thinning according to the first modification of the first embodiment.

The first modification of the first embodiment is an example in which columns are skipped in the row direction as illustrated in FIG. 15. More specifically in the example of FIG. 15, thinning is performed every other column for, for example, each of the blocks $51a_1$ to $51a_4$ with a height i and a width j illustrated in FIG. 10 to generate blocks $51c_1$, $51c_2$, $51c_3$, and $51c_4$ each having a height (i×2) and a width j corresponding to the blocks $51a_1$ to $51a_4$, respectively. A scan region 50c includes these blocks $51c_1$ to $51c_4$.

This will be described more specifically. As an example, it is assumed that each block $51c_1$ to $51c_4$ includes 9 pixels 10 in the row direction (width j=9). The respective pixels 10 disposed in the r-th column, the (r+2)th column, the (r+4)th column, the (r+6)th row, and the (r+8)th row are designated as the target pixels, and the respective pixels 10 disposed in the (r+1)th column, the (r+3)th column, the (r+5)th column, and the (r+7)th column are not designated as the target pixels.

With reference to FIGS. 4 and 7, for example, the overall controller 103 generates the signal EN_SPAD_V that designates each row included in the scan region 50c to turn on, and generates the signal EN_SPAD_H that designates each column to turn on (read)/off (non-read) every other column. The overall controller 103 passes the generated signals EN_SPAD_V and EN_SPAD_H to the vertical controller 102b and the horizontal controller 102a, respectively.

The vertical controller 102b generates the signal XEN_SPAD_V, for each row, that turns on respective rows included in the target region based on the passed signal EN_SPAD_V to supply the signal XEN_SPAD_V to the pixel array unit 100. Based on the passed signal EN_SPAD_H, the horizontal controller 102a generates the signal XEN_SPAD_H, for each column, that turns on and off respective columns included in the target region on a column basis to supply the signal XEN_SPAD_H to the pixel array unit 100.

In the case of this example, it is conceivable that the signal EN_PR that controls the supply of the power supply voltage Vdd to each light receiving element 1000 is generated by the horizontal controller 102a and supplied to each row.

In the case of the first modification of the first embodiment, considering the sharing of the read line described with reference to FIG. 9, it is conceivable to use a method in which, for example, pixels are divided in the column direction on a basis of the number of pixels 10 (the number of rows) from which simultaneous reading can be performed to perform scanning.

Here, in the example of FIG. 15, since the number of columns of each block $51c_1$ to $51c_4$ is odd, the number of pixels 10 designated as the target pixels in each block $51c_1$ to $51c_4$ is larger than, for example, the number of pixels 10 included as the target pixels in each block $51a_1$ to $51a_4$ in FIG. 10 by i pixels. Whether to allow the difference in the number of pixels 10, designated as the target pixels, which occurs between when thinning is not performed and when thinning is performed, depends on the specification of the system and the like.

Second Modification of First Embodiment

Figure 16:
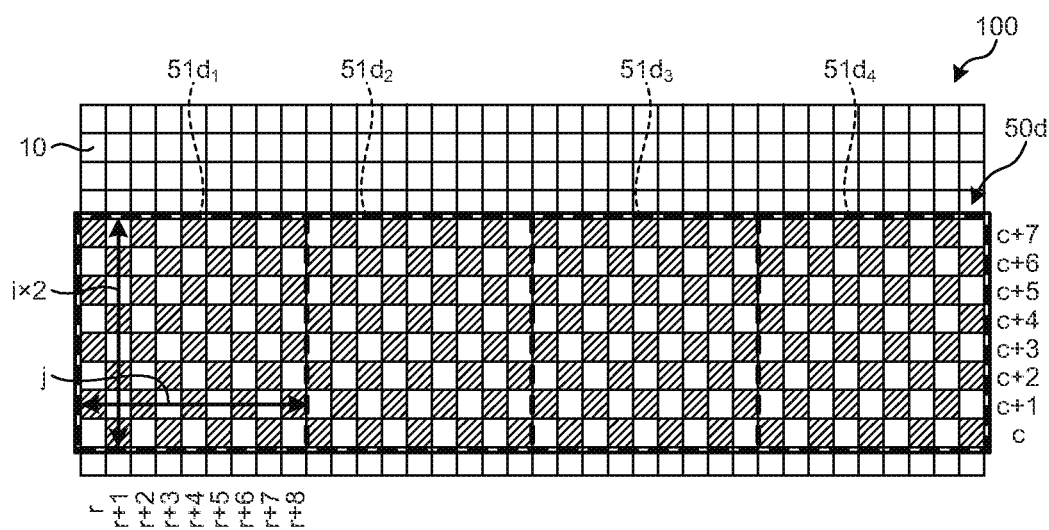
FIG. 16 is a diagram schematically illustrating an example of thinning according to the second modification of the first embodiment.

Next, a second modification of the first embodiment will be described. In the above, thinning is performed on a row basis or on a column basis, but the embodiment is not limited to this example. FIG. 16 is a diagram schematically illustrating an example of thinning according to the second modification of the first embodiment.

The second modification of the first embodiment is an example in which thinning is performed in each of the row direction and the column direction as illustrated in FIG. 16. More specifically, thinning is performed every other pixel 10 in the row direction and in the column direction on, for example, each block $51a_1$ to $51a_4$ with a height i and a width j illustrated in FIG. 10 to generate blocks $51d_1$, $51d_2$, $51d_3$, and $51d_4$ each having a height (i×2) and a width j corresponding to the blocks $51a_1$ to $51a_4$, respectively. A scan region 50d includes these blocks $51d_1$ to $51d_4$.

In the example of FIG. 16, in each of the blocks $51d_1$ to $51d_4$, the target pixels indicated by diagonal lines and the non-target pixels indicated by white are disposed in a checkered pattern. According to this thinning method, the target pixels are disposed so as not to be adjacent to each other in the column direction and the row direction.

This will be described more specifically. As an example, it is assumed that the block $51d_1$ includes 9 pixels 10 in the row direction (width j=9). In the r-th column, the (r+2)th column, the (r+4)th column, the (r+6)th row and the (r+8)th row, the (c+1)th row, the (c+3)th row, the (c+5)th row, and the (c+7)th row are designated as the target pixels. Also, in the (r+1)th column, the (r+3)th column, the (r+5)th column, and the (r+7)th row, the c-th row, the (c+2)th row, the (c+4)th row, the (c+6)th row, and the (c+8)th row are designated as the target pixels.

The block $51d_3$ and the block $51d_1$ are thinned in the same manner, and the blocks $51d_2$ and $51d_4$ are thinned in a manner in which the positions of the designated target pixels are obtained by inverting corresponding positions in the blocks $51d_1$ and $51d_3$.

In the second modification of the first embodiment, for example, it is conceivable to perform control so that scanning is performed on the same scan region 50d twice with the designated target pixels differentiated. With reference to FIGS. 4 and 7, for example, the overall controller 103 generates the signal EN_SPAD_V that designates each row included in the scan region 50d to turn on every other row, and generates the signal EN_SPAD_H that designates each column included in the scan region 50d to turn on every other column.

More specifically, for example, the overall controller 103 generates the signal EN_SPAD_V that designates the (c+1)th row, the (c+3)th row, the (c+5)th row, and the (c+7)th row to turn on. In addition, the overall controller 103 generates the signal EN_SPAD_H that designates the r-th column, the (r+2)th column, the (r+4)th column, the (r+6)th row, and the (r+8)th row of each block $51d_1$ to $51d_4$ to turn on. The overall controller 103 passes the generated signals EN_SPAD_V and EN_SPAD_H to the vertical controller 102b and the horizontal controller 102a, respectively.

Based on the passed signal EN_SPAD_V, the vertical controller 102b supplies, to the pixel array unit 100 the signal XEN_SPAD_V that turns on the (c+1)th row, the (c+3)th row, the (c+5)th row and the (c+7)th row, and turns off the c-th row, the (c+2)th row, the (c+4)th row, the (c+6)th row, and the (c+8)th row of respective rows included in the target region. Further, based on the passed signal EN_SPAD_H, the horizontal controller 102a supplies, to the pixel array unit 100, the signal XEN_SPAD_H that turns on the r-th column, the (r+2)th column, the (r+4)th column, the (r+6)th row and the (r+8)th row, and turns off the (r+1)th column, the (r+3)th column, the (r+5)th column, the (r+7)th row, and the (r+8)th row of each column included in the target region.

Further, the vertical controller 102b supplies the signal EN_PR that controls the supply of the power supply voltage Vdd to each light receiving element 1000 to the c-th row, the (c+2)th row, the (c+4)th row, the (c+6)th row, and the (c+8)th row.

As described above, the overall controller 103 perform control so that scanning is performed on the scan region 50d on which thinning is performed every other row and thinning is performed every other column. After this scan, the overall controller 103 inverts the designated positions of the target pixels in the scan region 50d, that is, the overall controller 103 sets the target pixel in a previous scan to the non-target pixel, and the asymmetrical pixel in the previous scan to the target pixel in the scan region 50d, and performs an operation for the scan region 50d again.

Also, in the second modification of this first embodiment, as in the first modification described above, the number of pixels 10 designated as the target pixels in each block $51d_1$ to $51d_4$ may differ from the number of pixels 10 included as the target pixels in each of the blocks $51a_1$ to $51a_4$ in FIG. 10, for example. Whether to allow the difference in the number of pixels 10, designated as the target pixels, which occurs between when thinning is not performed and when thinning is performed, depends on the specification of the system and the like.

Second Embodiment

Next, the second embodiment will be described. In the first embodiment described above and each modification thereof, the target pixel to be scanned is designated with the pixel 10 as a unit. In the second embodiment, the target pixel is designated for each block, and thinning is performed between the blocks.

Figure 17:
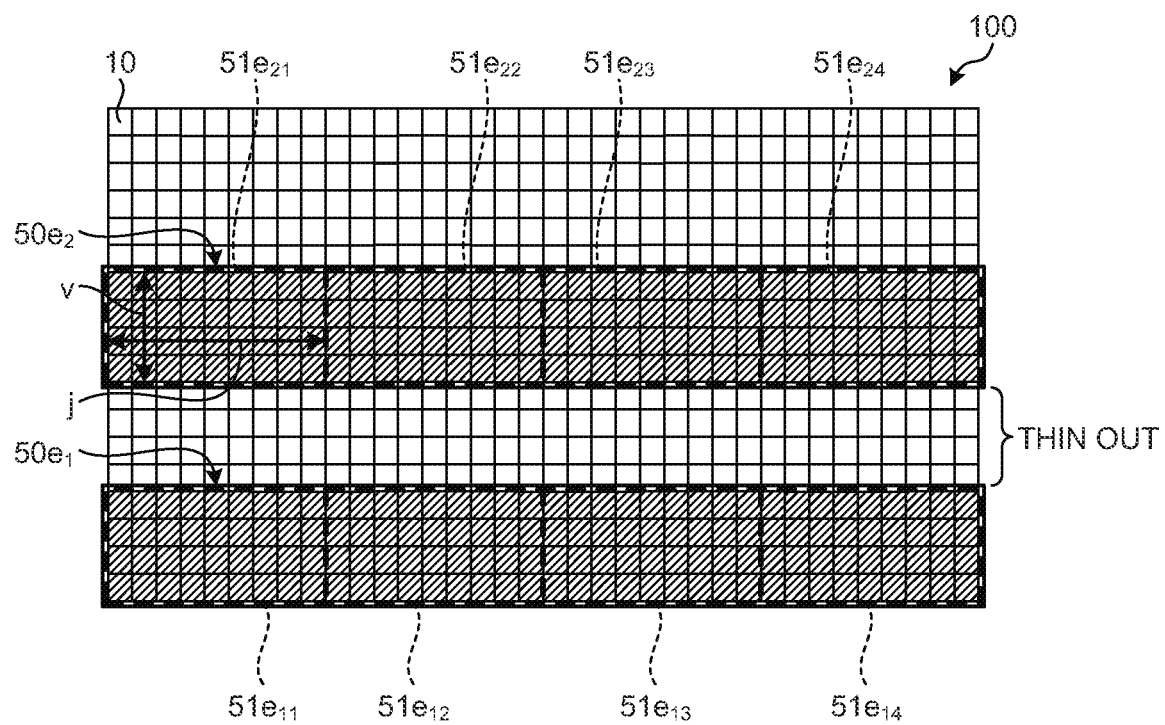
FIG. 17 is a diagram for explaining a method of scanning a pixel array unit according to the second embodiment.

FIG. 17 is a diagram for explaining a method of scanning the pixel array unit 100 according to the second embodiment. In FIG. 17, a scan region $50e_1$ includes four blocks $51e_{11}$, $51e_{12}$, $51e_{13}$, and $51e_{14}$. In this example, each block $51e_{11}$ to $51e_{14}$ includes v rows of the array of respective pixels 10 in the pixel array unit 100, and has a height v in the column direction. It is assumed that each block $51e_{11}$ to $51e_{14}$ has a width j corresponding to the j pixels 10 in the row direction as in FIG. 10 described above. Further, all the pixels 10 included in the blocks $51e_{11}$ to $51e_{14}$ are designated as the target pixels.

After scanning the scan region $50e_1$, the overall controller 103 skips a predetermined number of rows in the column direction and scans the next scan region $50e_2$. As in the scan region $50e_1$, the scan region $50e_2$ includes four blocks $51e_{21}$/$51e_{22}$, $51e_{23}$, and $51e_{24}$ each having a height v and a width j. As described above, in the example of FIG. 17, the overall controller 103 scans the scan region $50e_1$ and then skips a predetermined number of rows to scan the next scan region $50e_2$. The number of rows to be skipped is not particularly limited. In the example of FIG. 17, thinning is performed by the same number of rows (v rows) as those of the scan regions $50e_1$ and $50e_2$.

Figure 18:
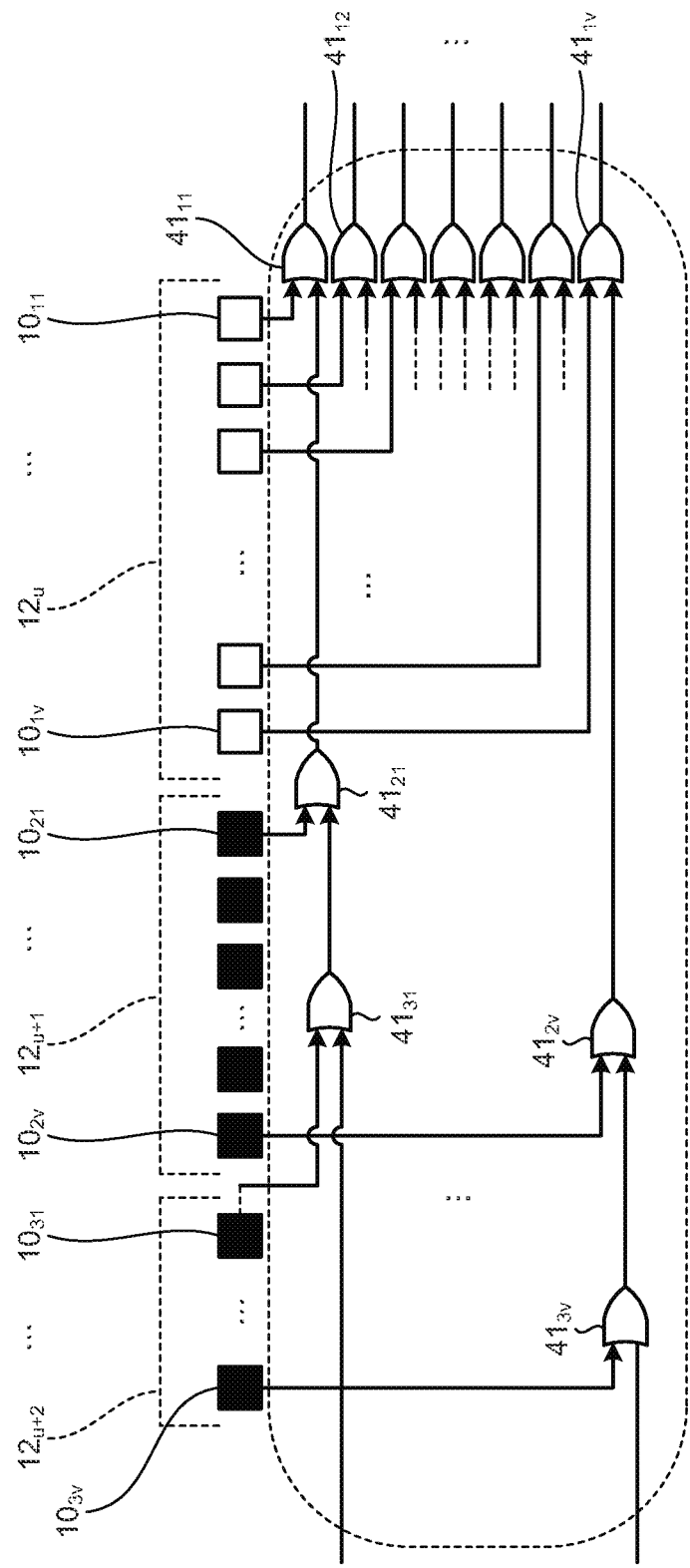
FIG. 18 is a diagram for explaining thinning corresponding to sharing of read lines according to the second embodiment.

FIG. 18 is a diagram corresponding to FIG. 9 described above, and is a diagram for explaining thinning corresponding to the sharing of the read line according to the second embodiment. In addition, in FIGS. 14A and 14B, the black square indicates pixels 10 controlled by the vertical controller 102b so that reading from the pixels 10 is not performed, or the pixels 10 are turned off, and the white square indicate pixels 10 that are controlled so that reading from the pixels 10 is performed.

As described above, the read line for reading the signal Vpls is shared for v pixels 10 in the column direction, and simultaneous reading from the v pixels 10 continuously disposed in the column direction can be performed. In FIG. 18, it is illustrated that the v pixels $10_{11}$ to $10_{1v}$ are designated for reading at the same time. Therefore, it is preferable that the height of the scan regions $50e_1$, $50e_2$, . . . be a height corresponding to the v pixels 10 or less than the v pixels 10, which allows simultaneous reading.

According to this second embodiment, the number of target pixels included in each block $51e_{11}$ to $51e_{14}$, . . . is equal to the number of target pixels included in the block (for example, block $51a_1$) when thinning is not performed. Therefore, the accuracy of distance measurement in each block $51e_{11}$ to $51e_{14}$, . . . is the same as that of a block when thinning is not performed. Since the thinning is performed on a block basis in the scanning method according to the second embodiment, the scanning method according to the second embodiment is disadvantageous in terms of resolution as compared with that according to the first embodiment described above.

Modification of Second Embodiment

Figure 19:
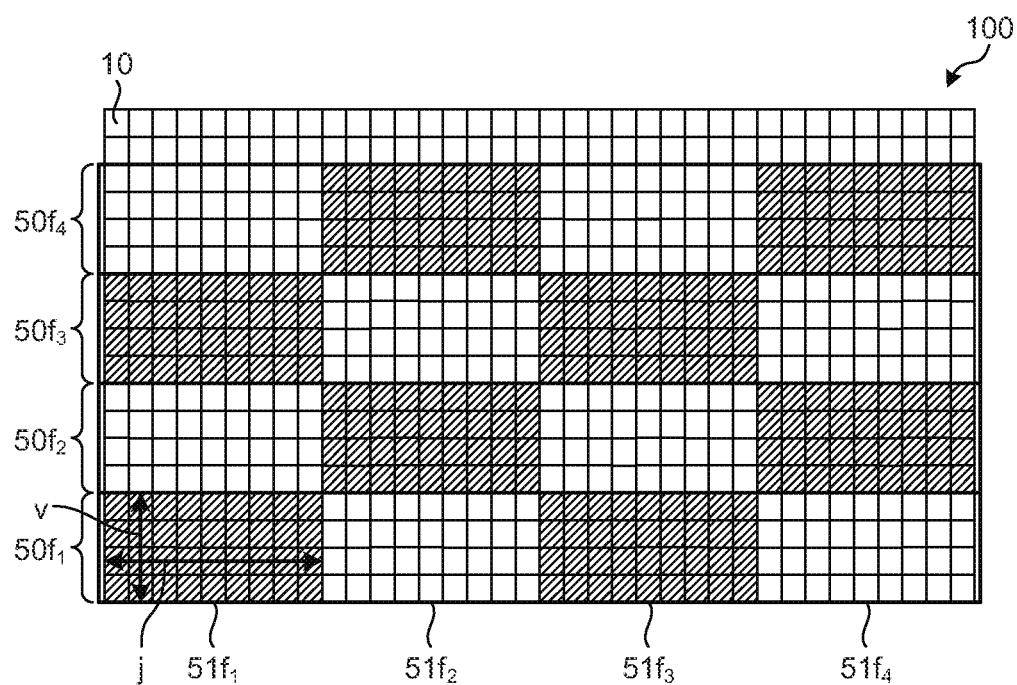
FIG. 19 is a diagram schematically illustrating an example of thinning according to the modification of the second embodiment.

Next, a modification of the second embodiment will be described. FIG. 19 is a diagram schematically illustrating an example of thinning according to the modification of the second embodiment. As illustrated in FIG. 19, the modification of the second embodiment is an example in which the target pixels are designated on a block basis, and when performing thinning between blocks, the target region of the pixel array unit 100 is thinned out in the row direction and the column direction on a block basis.

In FIG. 19, for example, a scan region $50f_1$ includes four blocks $51f_1$, $51f_2$, $51f_3$, and $51f_4$ each having a height v and a width j. In blocks $51f_1$ and $51f_3$ of these, all the included pixels 10 are designated as target pixels. On the other hand, in the blocks $51f_2$ and $51f_4$, all the included pixels 10 are non-target pixels.

In the scan region $50f_2$ immediately above the scan region $50f_1$, all of the pixels 10 included in the blocks corresponding to the blocks $51f_1$ and $51f_3$ in the scan region $50f_1$ are the non-target pixels, and all of the pixels 10 included in the blocks corresponding to the blocks $51f_2$ and $51f_4$ are the target pixels. Further, the scan region $50f_3$ immediately above the scan region $50f_2$ has the same configuration as the scan region $50f_1$, and the scan region $50f_4$ immediately above the scan region $50f_3$ has the same configuration as the scan region $50f_2$.

Also, in the modification of this second embodiment, the number of target pixels included in each block $51f_1$ to $51f_4$, . . . is equal to the number of target pixels included in the block (for example, block $51a_1$) when thinning is not performed. Therefore, the accuracy of distance measurement in each block $51f_1$ to $51f_4$, . . . is the same as that of a block when thinning is not performed. Since the thinning is performed on a block basis in the scanning method according to the modification of the second embodiment, the scanning method according to the second embodiment is disadvantageous in terms of resolution as compared with that according to the first embodiment described above.

Third Embodiment

Figure 20:
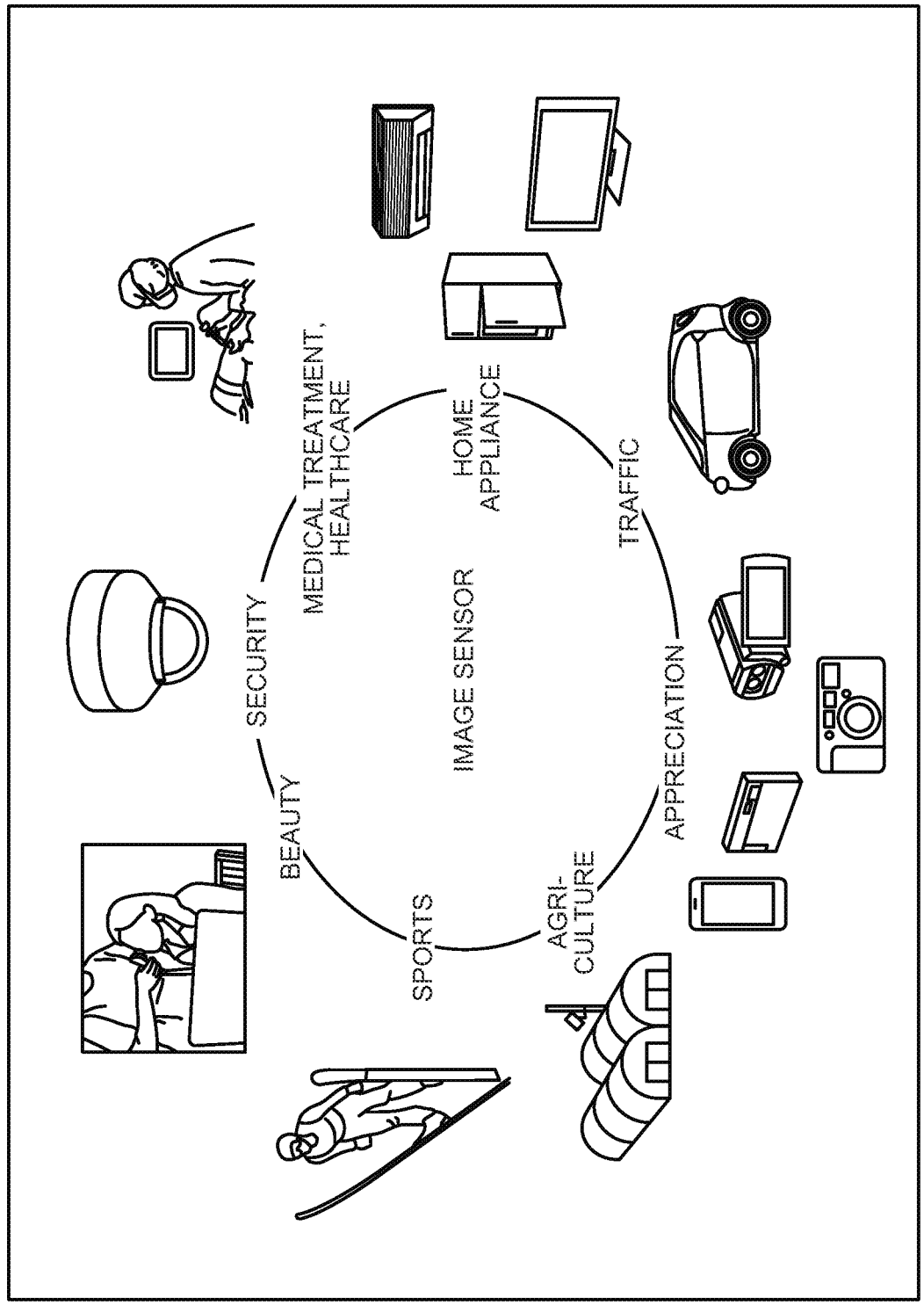
FIG. 20 is a diagram illustrating a usage example using a distance measuring device according to the first embodiment and each modification thereof, and the second embodiment and the modification thereof according to the third embodiment.

Next, as the third embodiment of the present disclosure, the first embodiment of the present disclosure and each modification thereof, and the application example of the modification of the second embodiment will be described. FIG. 20 is a diagram illustrating a usage example in which the distance measuring device 1 according to each modification of the first embodiment and the first embodiment described above according to the second embodiment is used.

The distance measuring device 1 described above can be used in various cases in which light such as visible light, infrared light, ultraviolet light, and X-ray is sensed as described below.

A device that captures images used for appreciation, such as a digital camera and a mobile device with a camera function.

A device used for traffic, such as an in-vehicle sensor that images the front, rear, surroundings, and interior of an automobile, a surveillance camera that monitors traveling vehicles and roads, a distance measuring sensor that measures a distance between vehicles, and the like, for safe driving such as automatic stop and recognition of the driver's condition, etc.

A device used for home appliances, such as a TV, a refrigerator, and an air conditioner, to take a picture of a user's gesture and operate the device according to the gesture.

A device used for medical treatment and healthcare, such as an endoscope and a device that performs angiography by receiving infrared light.

A device used for security, such as a surveillance camera for crime prevention and a camera for personal authentication.

A device used for beauty, such as a skin measuring device that photographs the skin and a microscope that photographs the scalp.

A device used for sports, such as an action camera and a wearable camera for sports applications.

A device used for agriculture, such as a camera for monitoring the condition of fields and crops.

Further Application Example of Technology According to Present Disclosure

Example of Application to Moving Object

The technology according to the present disclosure may be further applied to devices mounted on various moving objects such as automobiles, electric vehicles, hybrid electric vehicles, motorcycles, bicycles, personal mobility, airplanes, drones, ships, and robots.

Figure 21:
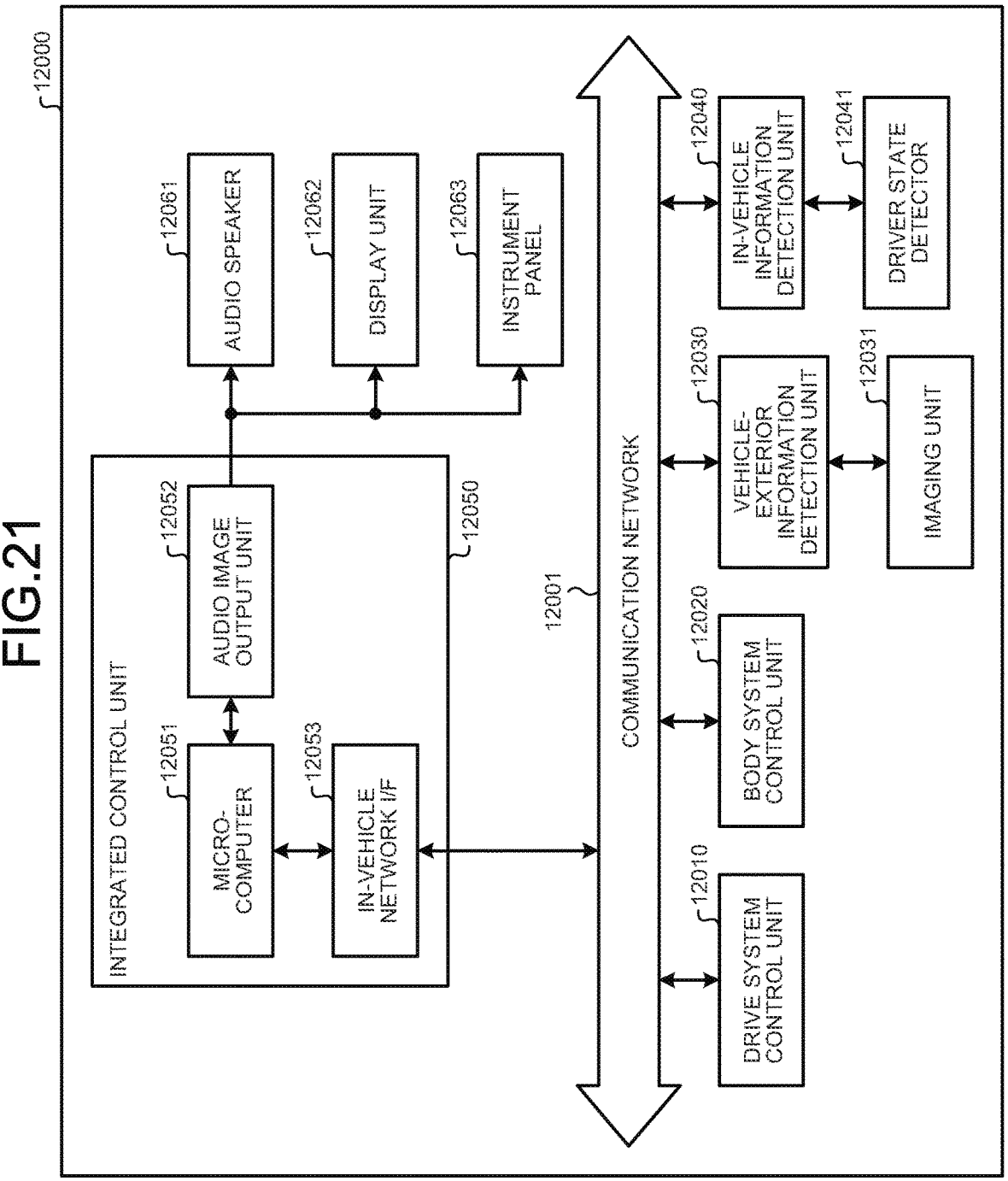
FIG. 21 is a block diagram illustrating a schematic configuration example of a vehicle control system, which is an example of a moving object control system to which the technique according to the present disclosure can be applied.

FIG. 21 is a block diagram illustrating a schematic configuration example of a vehicle control system, which is an example of a moving object control system to which the technique according to the present disclosure can be applied.

A vehicle control system 12000 includes a plurality of electronic control units connected via a communication network 12001. In the example illustrated in FIG. 21, the vehicle control system 12000 includes a drive system control unit 12010, a body system control unit 12020, a vehicle-exterior information detection unit 12030, an in-vehicle information detection unit 12040, and an integrated control unit 12050. Further, as the functional configuration of the integrated control unit 12050, a microcomputer 12051, an audio image output unit 12052, and an in-vehicle network I/F (interface) 12053 are illustrated.

The drive system control unit 12010 controls the operation of the device related to the drive system of the vehicle according to various programs. For example, the drive system control unit 12010 serves as a driving force generation unit that generates the driving force of the vehicle such as an internal combustion engine or a driving motor, a driving force transmission mechanism that transmits the driving force to the wheels, a steering mechanism for adjusting a steering angle of the vehicle, and a control device such as a braking device that generates a braking force of the vehicle.

The body system control unit 12020 controls the operation of various devices mounted on the vehicle body according to various programs. For example, the body system control unit 12020 functions as a control device for a keyless entry system, a smart key system, a power window device, or various lamps such as a head lamp, a back lamp, a brake lamp, a blinker and a fog lamp. In this case, the body system control unit 12020 may receive radio waves transmitted from a portable device that substitutes for the key or signals of various switches. The body system control unit 12020 receives the input of these radio waves or signals and controls a door lock device, a power window device, a lamp, and the like of the vehicle.

The vehicle-exterior information detection unit 12030 detects information outside the vehicle equipped with the vehicle control system 12000. For example, an imaging unit 12031 is connected to the vehicle-exterior information detection unit 12030. The vehicle-exterior information detection unit 12030 causes the imaging unit 12031 to capture an image of the outside of the vehicle and receives the picked up image. The vehicle-exterior information detection unit 12030 may perform the object detection process or the distance detection process of detecting a person, a vehicle, an obstacle, a sign, or characters on the road surface based on the received image. The vehicle-exterior information detection unit 12030 performs the image process on the received image, for example, and performs the object detection process and the distance detection process based on the result of the image process.

The imaging unit 12031 is an optical sensor that receives light to output an electrical signal according to the amount of the light received. The imaging unit 12031 can output an electrical signal as an image or can output it as distance measurement information. Further, the light received by the imaging unit 12031 may be visible light or invisible light such as infrared light.

The in-vehicle information detection unit 12040 detects in-vehicle information. For example, a driver state detector 12041 that detects the driver's state is connected to the in-vehicle information detection unit 12040. The driver state detector 12041 includes, for example, a camera that captures the driver, and the in-vehicle information detection unit 12040 may calculate the degree of fatigue or concentration of the driver, or may determine whether the driver is dozing based on the detection information input from the driver state detector 12041.

The microcomputer 12051 can calculate the control target value of the driving force generation unit, the steering mechanism or the braking device based on the information inside and outside the vehicle acquired by the vehicle-exterior information detection unit 12030 or the in-vehicle information detection unit 12040 to output a control command to the drive system control unit 12010. For example, the microcomputer 12051 can perform cooperative control for the purpose of realizing a function of an advanced driver assistance system (ADAS) including vehicle collision avoidance or impact mitigation, follow-up driving based on inter-vehicle distance, vehicle speed maintenance driving, vehicle collision warning, or vehicle lane deviation warning.

In addition, based on the information around the vehicle acquired by the vehicle-exterior information detection unit 12030 or the in-vehicle information detection unit 12040, the microcomputer 12051 can perform cooperative control for the purpose of automatic driving or the like in which the vehicle travels autonomously without depending on the operation of the driver by controlling the driving force generation unit, the steering mechanism, the braking device, etc.

Further, the microcomputer 12051 can output a control command to the body system control unit 12020 based on the information outside the vehicle acquired by the vehicle-exterior information detection unit 12030. For example, the microcomputer 12051 can control the head lamps according to the position of the preceding vehicle or the oncoming vehicle detected by the vehicle-exterior information detection unit 12030 to perform cooperative control for the purpose of anti-glare such as switching the high beam to the low beam.

The audio image output unit 12052 transmits an output signal of at least one of an audio and an image to an output device capable of visually or audibly notifying the passenger or the outside of the vehicle of information. In the example of FIG. 21, an audio speaker 12061, a display unit 12062, and an instrument panel 12063 are exemplified as output devices. The display unit 12062 may include, for example, at least one of an onboard display and a heads-up display.

Figure 22:
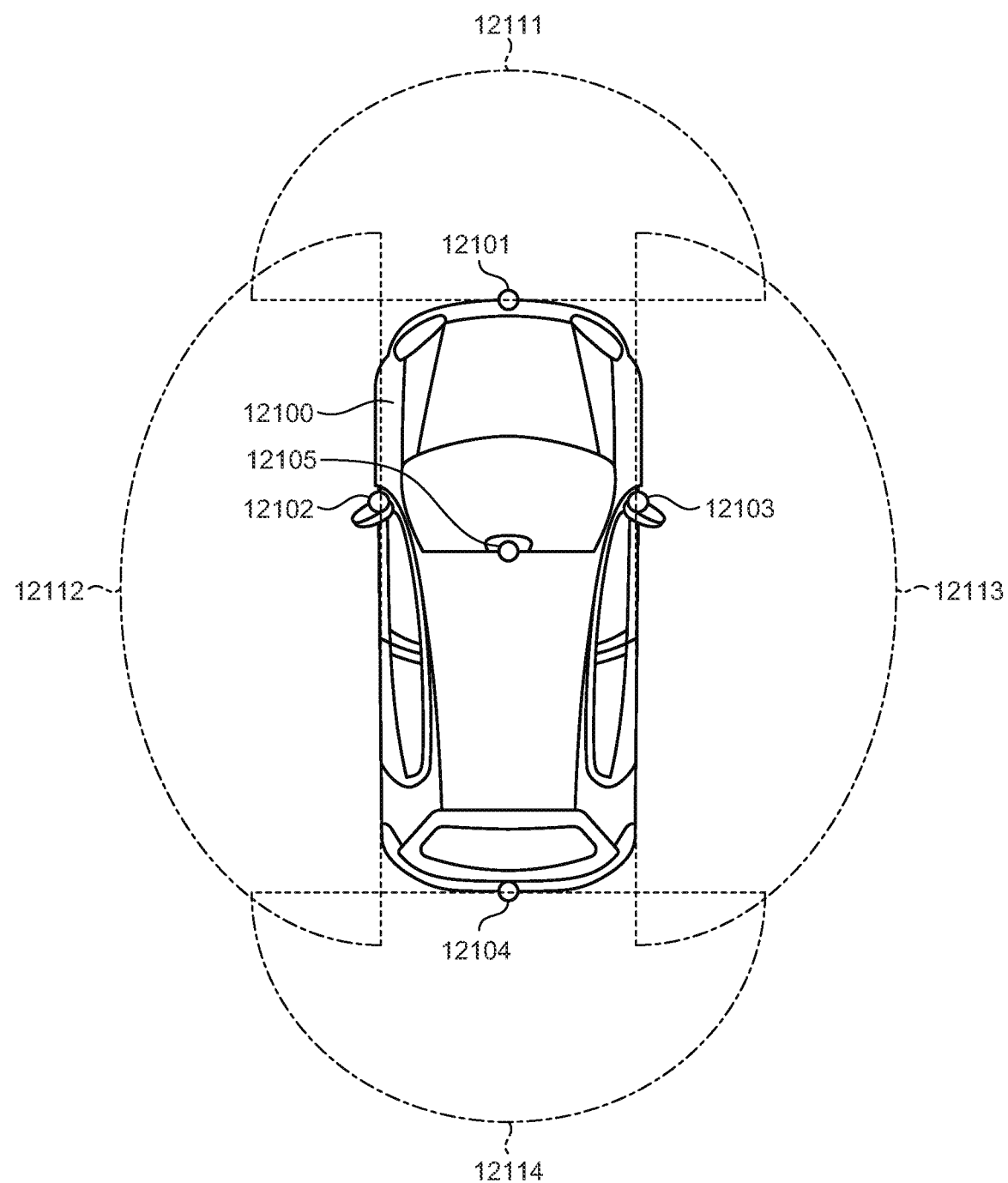
FIG. 22 is a diagram illustrating an example of an installation position of an imaging unit.

FIG. 22 is a diagram illustrating an example of the installation position of the imaging unit 12031. In FIG. 22, a vehicle 12100 has imaging units 12101, 12102, 12103, 12104, and 12105 as the imaging unit 12031.

For example, the imaging units 12101, 12102, 12103, 12104, and 12105 are provided at positions such as the front nose, the side mirrors, the rear bumper, the back door, and the upper part of the windshield in the vehicle interior of the vehicle 12100. The imaging unit 12101 provided on the front nose and the imaging unit 12105 provided on the upper part of the windshield in the vehicle interior mainly acquire an image in front of the vehicle 12100. The imaging units 12102 and 12103 provided on the side mirrors mainly acquire images of the sides of the vehicle 12100. The imaging unit 12104 provided on the rear bumper or the back door mainly acquires an image behind the vehicle 12100. The front image acquired by the imaging units 12101 and 12105 is mainly used for detecting a preceding vehicle or a pedestrian, an obstacle, a traffic light, a traffic sign, a lane, or the like.

Note that FIG. 22 illustrates an example of the shooting range of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the side mirrors, respectively, and an imaging range 12114 indicates the imaging range of the imaging unit 12104 provided on the rear bumper or the back door. For example, by superimposing the image data imaged by the imaging units 12101 to 12104, a bird's-eye view image of the vehicle 12100 as viewed from above can be obtained.

At least one of the imaging units 12101 to 12104 may have a function of acquiring distance information. For example, at least one of the imaging units 12101 to 12104 may be a stereo camera composed of a plurality of imaging devices, or may be an imaging device having pixels for phase-difference detection.

For example, by finding the distance to each three-dimensional object within the imaging ranges 12111 to

12114, and the temporal change of this distance (relative velocity with respect to the vehicle 12100) based on the distance information obtained from the imaging units 12101 to 12104, the microcomputer 12051 can extract, in particular, a three-dimensional object that is the closest three-dimensional object on the traveling path of the vehicle 12100 and that travels in substantially the same direction as the vehicle 12100 at a predetermined speed (for example, 0 km/h or more) as a preceding vehicle. Further, the microcomputer 12051 can set an inter-vehicle distance to be secured in front of the preceding vehicle in advance, and can perform automatic braking control (including follow-up stop control), automatic acceleration control (including follow-up start control), and the like. In this way, cooperative control can be performed for the purpose of automatic driving or the like in which the vehicle travels autonomously without depending on the driver's operation.

For example, the microcomputer 12051 can sort three-dimensional object data related to a three-dimensional object into a two-wheeled vehicle, an ordinary vehicle, a large vehicle, a pedestrian, and other three-dimensional objects such as a utility pole based on the distance information obtained from the imaging units 12101 to 12104 to extract them, and can use them for automatic avoidance of obstacles. For example, the microcomputer 12051 identifies obstacles around the vehicle 12100 as an obstacle that are visible to the driver of the vehicle 12100 and an obstacle that are difficult to see. The microcomputer 12051 can determine the collision risk, which indicates the risk of collision with each obstacle, and when the collision risk is above the set value and there is a possibility of collision, the microcomputer 12051 can provide a driving assistance for collision avoidance by outputting an alarm to the driver via the audio speaker 12061 or the display unit 12062, or by performing forced deceleration and avoidance steering via the drive system control unit 12010.

At least one of the imaging units 12101 to 12104 may be an infrared camera that detects infrared rays. For example, the microcomputer 12051 can recognize a pedestrian by determining whether the pedestrian is present in the picked up images of the imaging units 12101 to 12104. Such pedestrian recognition includes, for example, a procedure for extracting feature points in picked up images of the imaging units 12101 to 12104 as an infrared camera, and a procedure of performing a pattern matching process on a series of feature points indicating the outline of an object to determine whether the object is a pedestrian. The microcomputer 12051 determines that a pedestrian is present in the picked up images of the imaging units 12101 to 12104, and when the pedestrian is recognized, the audio image output unit 12052 causes the display unit 12062 to superimpose and display a square outline for emphasis on the recognized pedestrian. Further, the audio image output unit 12052 may cause the display unit 12062 to display an icon or the like indicating the pedestrian at a desired position.

An example of the vehicle control system to which the technique according to the present disclosure can be applied is described above. The technique according to the present disclosure can be applied to, for example, the imaging unit 12031 of the configuration described above. Specifically, the distance measuring device 1 according to the first embodiment of the present disclosure described above can be applied to the imaging unit 12031. By applying the technique according to the present disclosure to the imaging unit 12031, it is possible to increase the distance measuring speed and save power of the distance measuring device 1 that measures the distance from a traveling vehicle.

Further, the effects in each embodiment described in the present specification are merely examples and are not limited, and other effects may be present.

Note that the present technology may also be configured as below.

(1) A measurement device comprising:
  a light receiving unit including a plurality of pixels disposed in a target region in a matrix array;
  a controller that designates one or more target pixels, of the plurality of pixels, from which a signal is to be read; and
  a signal processing unit that performs a signal process based on the signal read from the one or more target pixels included in a block having a predetermined width in a row direction of the array and having a variable height in a column direction, wherein
  the controller
  switches, according to an instruction, between a first mode in which the one or more target pixels are designated after performing thinning on the plurality of pixels, and a second mode in which the one or more target pixels are designated without performing the thinning.

(2) The measurement device according to the above (1), wherein
  the controller
  designates the one or more target pixels with the block as a unit, and controls the thinning so that the number of the one or more target pixels included in the block in the first mode is substantially equal to the number of the one or more target pixels included in the block in the second mode.

(3) The measurement device according to the above (1) or (2), wherein
  the controller
  designates the one or more target pixels with the block as a unit.

(4) The measurement device according to any one of the above (1) to (3), wherein
  the controller
  performs, in the first mode, the thinning on a column direction of the array.

(5) The measurement device according to any one of the above (1) to (3), wherein
  the controller
  performs, in the first mode, the thinning on a row direction of the array.

(6) The measurement device according to any one of the above (1) to (3), wherein
  the controller
  performs, in the first mode, the thinning on a column direction and a row direction of the array.

(7) The measurement device according to any one of the above (1) to (6), wherein
  each of a plurality of signal lines that transmits respective signals which are read from the plurality of pixels which is provided in the light receiving unit along a column direction of the array
  is connected to two or more pixels, of the plurality of pixels, disposed along a column direction of the array every (v−1) pixels (where v is an integer of two or more) along the column direction of the array, and
  the controller
  designates the thinning at intervals at which the reading is not performed simultaneously from the two or more pixels.

(8) The measurement device according to any one of the above (1) to (7), wherein
the controller
stops power supply to a pixel, of the plurality of pixels, which is not designated as the one or more target pixels.
(9) The measurement device according to any one of the above (1) to (8), wherein
the controller
switches between the first mode and the second mode according to the instruction from an outside.
(10) A distance measuring device comprising:
a light receiving unit including a plurality of pixels disposed in a target region in a matrix array;
a controller that designates one or more target pixels, of the plurality of pixels, from which a signal is to be read;
a time acquisition unit that measures a time from light emission timing when a light source emits light to light reception timing when the pixel included in a block having a predetermined width in a row direction of the array and having a variable height in a column direction receives the light to acquire a measured value;
a generation unit that adds the number of the measured values in each predetermined time range based on the measured values to generate a histogram related to the block; and
a calculation unit that calculates a distance to an object to be measured based on the histogram, wherein
the controller
switches, according to an instruction, between a first mode in which the one or more target pixels are designated after performing thinning on the plurality of pixels, and a second mode in which the one or more target pixels are designated without performing the thinning.
(11) The distance measuring device according to the above (10), wherein
the controller
designates the one or more target pixels with the block as a unit, and controls the thinning so that the number of the one or more target pixels included in the block in the first mode is substantially equal to the number of the one or more target pixels included in the block in the second mode.
(12) The distance measuring device according to the above (10) or (11), wherein
the controller
designates the one or more target pixels with the block as a unit.
(13) The distance measuring device according to any one of the above (10) to (12), wherein
the controller
performs, in the first mode, the thinning on a column direction of the array.
(14) The distance measuring device according to any one of the above (10) to (12), wherein
the controller
performs, in the first mode, the thinning on a row direction of the array.
(15) The distance measuring device according to any one of the above (10) to (12), wherein
the controller
performs, in the first mode, the thinning on a column direction and a row direction of the array.
(16) The distance measuring device according to any one of the above (10) to (15), wherein
each of a plurality of signal lines that transmits respective signals which are read from the plurality of pixels which is provided in the light receiving unit along a column direction of the array
is connected to two or more pixels, of the plurality of pixels, disposed along a column direction of the array every (v−1) pixels (where v is an integer of two or more) along the column direction of the array, and
the controller
designates the thinning at intervals at which the reading is not performed simultaneously from the two or more pixels.
(17) The distance measuring device according to any one of the above (10) to (16), wherein
the controller
stops power supply to a pixel, of the plurality of pixels, which is not designated as the one or more target pixels.
(18) The distance measuring device according to any one of the above (10) to (17), wherein
the controller
switches between the first mode and the second mode according to the instruction from an outside.

REFERENCE SIGNS LIST

1 DISTANCE MEASURING DEVICE
2 LIGHT SOURCE UNIT
3 STORAGE UNIT
4 CONTROLLER
6 ELECTRONIC DEVICE
10, $10_{11}$, $10_{13}$, $10_{1v}$, $10_{21}$, $10_{22}$, $10_{2v}$, $10_{31}$, $10_{3v}$ PIXEL
11 ELEMENT
$41_{11}$, $41_{1v}$, $41_{21}$, $41_{2v}$, $41_{31}$, $41_{37}$ OR CIRCUIT
50a, 50b, 50c, 50d, $50e_1$, $50e_2$, $50f_1$, $50f_2$, $50f_3$, $50f_4$ SCAN REGION
$51a_1$, $51a_2$, $51a_3$, $51a_4$, $51b_1$, $51b_2$, $51b_3$, $51b_4$, $51b_4'$, $51c_1$, $51c_2$, $51c_3$, $51c_4$, $51d_1$, $51d_2$, $51d_3$, $51d_4$, $51e_{11}$, $51e_{12}$, $51e_{13}$, $51e_{14}$, $51e_{21}$, $51e_{22}$, $51e_{23}$, $51e_{24}$, $51f_1$, $51f_2$, $51f_3$, $51f_4$ BLOCK
100 PIXEL ARRAY UNIT
102 PIXEL CONTROLLER
102a HORIZONTAL CONTROLLER
102b VERTICAL CONTROLLER
103 OVERALL CONTROLLER

The invention claimed is:
1. A measurement device, comprising:
a light receiving unit that includes a plurality of pixels in a target region in a matrix array, wherein the plurality of pixels includes a plurality of read lines;
a controller configured to designate at least one target pixel of the plurality of pixels, wherein
the plurality of read lines is configured to perform a reading process to read a specific signal from the at least one target pixel of the plurality of pixels; and
a signal processing unit configured to perform a signal process based on the specific signal is included in a block, wherein
specific width of the block is in a row direction of the matrix array,
a height of the block is variable in a column direction of the matrix array, and
the controller is further configured to:
switch between a first mode and a second mode based on an instruction;
designate, in the first mode, the at least one target pixel of the plurality of pixels after a thinning process on the plurality of pixels; and designate, in the second mode, the at least one target pixel of the plurality of pixels without the thinning process.

2. The measurement device according to claim 1, wherein the controller is further configured to:
designate the at least one target pixel of the plurality of pixels with the block as a unit; and
control the thinning process such that a number of the at least one target pixel of the plurality of pixels included in the block in the first mode is equal to a number of the at least target pixel of the plurality of pixels included in the block in the second mode.

3. The measurement device according to claim 1, wherein the controller is further configured to designate the at least one target pixel of the plurality of pixels with the block as a unit.

4. The measurement device according to claim 1, wherein the controller is further configured to perform, in the first mode, the thinning process on the column direction of the matrix array.

5. The measurement device according to claim 1, wherein the controller is further configured to perform, in the first mode, the thinning process on the row direction of the matrix array.

6. The measurement device according to claim 1, wherein the controller is further configured to perform, in the first mode, the thinning process on the column direction of the matrix array and the row direction of the matrix array.

7. The measurement device according to claim 1, further comprising a plurality of signal lines, wherein
each of the plurality of signal lines is configured to transmit a plurality of signals,
the plurality of read lines is further configured to read the plurality of signals from the plurality of pixels,
the plurality of pixels is in the light receiving unit along the column direction of the matrix array,
each of the plurality of signal lines is connected to at least two pixels of the plurality of pixels,
the at least two pixels of the plurality of pixels are at (v−1) pixels along the column direction of the matrix array,
v is an integer greater than or equal to two, and
the controller is further configured to designate the thinning process at intervals at which the reading process is not performed from the at least two pixels of the plurality of or more pixels.

8. The measurement device according to claim 1, wherein
the controller is further configured to stop power supply to a specific pixel of the plurality of pixels, and
the specific pixel is not designated as the at least one target pixel of the plurality of pixels.

9. The measurement device according to claim 1, wherein the controller is further configured to switch between the first mode and the second mode based on the instruction from an outside.

10. A distance measuring device, comprising:
a light receiving unit configured to receive specific light from a light source, wherein
the light receiving unit includes a plurality of pixels in a target region in a matrix array, and
the plurality of pixels includes a plurality of read lines;
a controller configured to designate at least one target pixel of the plurality of pixels, wherein
the plurality of read lines is configured to perform a reading process to read a specific signal from the at least one target pixel of the plurality of pixels;
a time acquisition unit configured to measure a time period from a time of light emission to a time of light reception based on a first pixel of the plurality of pixels is included in a block, wherein
the time of light emission corresponds to a time associated with emission of light by the light source,
the time of light reception corresponds to a time associated with the reception of the specific light,
a specific width of the block is in a row direction of the matrix array, and
a height of the block is variable in a column direction of the matrix array;
a generation unit configured to:
add a number of the measured time period in a specific time range based on the measured time period; and
generate, based on the addition of the number of the measured time period, a histogram associated with the block; and
a calculation unit configured to calculate a distance to an object based on the histogram, wherein the controller is further configured to:
switch between a first mode and a second mode based on an instruction;
designate, in the first mode, the at least one target pixel of the plurality of pixels after a thinning process on the plurality of pixels; and
designate, in the second mode, the at least one target pixel of the plurality of pixels without performing the thinning process.

11. The distance measuring device according to claim 10, wherein the controller is further configured to:
designate the at least one target pixel of the plurality of pixels with the block as a unit; and
control the thinning process such that a number of the at least one target pixel of the plurality of pixels included in the block in the first mode is equal to a number of the at least one target pixel of the plurality of pixels included in the block in the second mode.

12. The distance measuring device according to claim 10, wherein the controller is further configured to designate the at least one target pixel of the plurality of pixels with the block as a unit.

13. The distance measuring device according to claim 10, wherein the controller is further configured to perform, in the first mode, the thinning process on the column direction of the matrix array.

14. The distance measuring device according to claim 10, wherein the controller is further configured to perform, in the first mode, the thinning process on the row direction of the matrix array.

15. The distance measuring device according to claim 10, wherein the controller is further configured to perform, in the first mode, the thinning process on the column direction of the matrix array and the row direction of the matrix array.

16. The distance measuring device according to claim 10, further comprising a plurality of signal lines, wherein
each of the plurality of signal lines is configured to transmit a plurality of signals,
the plurality of read lines is further configured to read the plurality of signals from the plurality of pixels,
the plurality of pixels is in the light receiving unit along the column direction of the matrix array,
each of the plurality of signal lines is connected to at least two pixels of the plurality of pixels,
the at least two pixels of the plurality of pixels are at (v−1) pixels along the column direction of the matrix array,
v is an integer greater than or equal to two, and the controller is further configured to designate the thinning process at intervals at which the reading process is not performed from the at least two pixels of the plurality of pixels.

17. The distance measuring device according to claim 10, wherein the controller is further configured to stop power supply to a second pixel of the plurality of pixels, and the second pixel is not designated as the at least one target pixel of the plurality of pixels.

18. The distance measuring device according to claim 10, wherein the controller is further configured to switch between the first mode and the second mode based on the instruction from an outside.

* * * * *